(12) United States Patent
Upchurch

(10) Patent No.: US 11,403,811 B1
(45) Date of Patent: Aug. 2, 2022

(54) ESTIMATING OPTICAL PARAMETERS OF SURFACES

(71) Applicant: Apple Inc., Cupertino, CA (US)

(72) Inventor: Paul Upchurch, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/802,962

(22) Filed: Feb. 27, 2020

Related U.S. Application Data

(60) Provisional application No. 62/812,128, filed on Feb. 28, 2019.

(51) Int. Cl.
*G06T 15/50* (2011.01)
*G06N 20/00* (2019.01)
*G06T 15/20* (2011.01)

(52) U.S. Cl.
CPC ............. *G06T 15/50* (2013.01); *G06N 20/00* (2019.01); *G06T 15/20* (2013.01); *G06T 2215/16* (2013.01)

(58) Field of Classification Search
CPC ................................ G06T 15/50; G06N 20/00
See application file for complete search history.

(56) References Cited

U.S. PATENT DOCUMENTS

| | | | | |
|---|---|---|---|---|
| 2009/0304299 A1* | 12/2009 | Motomura | ......... | H04N 5/23245 382/254 |
| 2010/0303344 A1* | 12/2010 | Sato | ................... | H04N 9/04557 382/162 |
| 2011/0063512 A1* | 3/2011 | Leichsenring | ........ | G06T 19/006 348/589 |
| 2011/0249023 A1* | 10/2011 | Nakamura | ............. | H04N 5/262 345/619 |
| 2012/0248314 A1* | 10/2012 | Karam | ............... | G01N 21/3581 250/341.3 |
| 2018/0222048 A1* | 8/2018 | Hasegawa | ............. | B25J 9/1697 |

* cited by examiner

*Primary Examiner* — Yi Yang
(74) *Attorney, Agent, or Firm* — Fernando & Partners, LLP

(57) ABSTRACT

In one implementation, a method of estimating optical parameters of surfaces within image data is performed at an electronic device including one or more processors and non-transitory memory. The method includes obtaining an image data frame of a physical environment; obtaining an estimate of an environmental light source summary of the physical environment based on the image data frame; generating, from the image data frame and the estimate of the environmental light source summary, estimated values for optical parameters of a surface within the physical environment, wherein the surface corresponds to at least a portion of the image data frame; and presenting a computer-generated reality (CGR) environment including the surface based at least in part on the estimated values for the optical parameters of the surface and CGR content.

22 Claims, 11 Drawing Sheets

ESTIMATING OPTICAL PARAMETERS OF SURFACES

CROSS-REFERENCE TO RELATED APPLICATIONS

This application claims the benefit of U.S. Provisional Patent App. No. 62/812,128, filed on Feb. 28, 2019, which is incorporated by reference in its entirety.

TECHNICAL FIELD

The present disclosure generally relates to an image processing system, and in particular, to an image processing system that estimates optical parameters of real-world surfaces within image data in order to model light propagation between real-world light sources and computer-generated reality (CGR) surfaces, and also between CGR light sources and real-world surfaces.

BACKGROUND

Optical parameters (e.g., an albedo optical parameter, a reflectance optical parameter, etc.) of real-world surfaces (e.g., wood, metal, human skin, fruit, etc.) are difficult to measure from image data. For example, the optical parameters of a real-world surface composed of an unknown material are difficult to measure due to a combined effect of ambient lighting conditions, different viewpoints of the real-world surface, and/or the like. A computer-generated reality (CGR) system should be able to present CGR content such that a human believes that CGR and/or real-world objects coexist with real-world and/or CGR light sources. In order to do so in a believable manner, the CGR system should be able to model light propagation between real-world light sources and CGR surfaces, and also between CGR light sources and real-world surfaces. For example, a CGR light source may change the appearance of real-world surfaces or, alternatively, a real-world light source reflected off real-world surfaces may change the appearance of CGR objects. As such, CGR objects and real-world objects may not behave believably in a CGR environment without accounting for the optical parameters of real-world surfaces.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
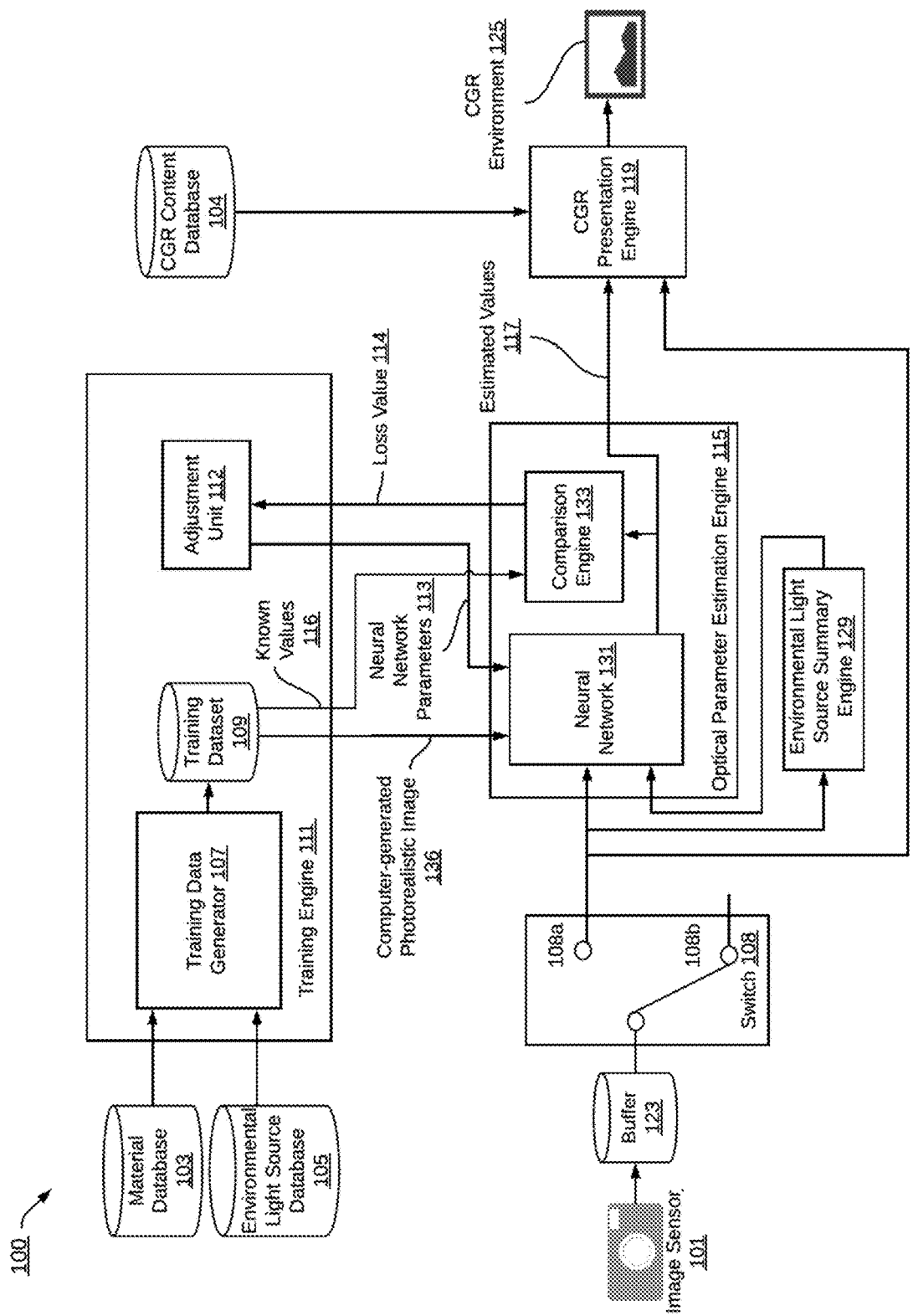
FIG. 1 is a block diagram of an example image processing system in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for training an image processing system. According to some implementations, the method is performed (e.g., during training) at an electronic device including one or more processors, a non-transitory memory, an optical parameter estimation engine, a comparison engine, and a training engine. The method includes: generating, by the optical parameter estimation engine, estimated values for one or more optical parameters of a surface within at least a portion of a training image, wherein the training image is obtained from training data; generating, by the optical parameter estimation engine, a set of reconstruction images based at least in part on the estimated values for the one or more optical parameters of the surface within at least the portion of the training image; comparing, by the comparison engine, the estimated values for the one or more optical parameters of the surface against target values for the one or more optical parameters of the surface; comparing, by the comparison engine, pixels of the set of reconstruction images against pixels of a set of reference reconstruction images, wherein the set of reference reconstruction images is generated based at least in part on setting the one or more optical parameters to the target values; and adjusting, by the training engine, operating parameters of the optical parameter estimation engine based on a loss function, wherein the loss function aggregates: (A) differences between the estimated values and the target values for the one or more optical parameters of the surface; and (B) differences between the pixels of the set of reconstruction images and the pixels of the set of reference reconstruction images.

According to some implementations, the method is performed (e.g., during run-time) at an electronic device including one or more processors and a non-transitory memory. The method includes obtaining an image data frame of a physical environment; obtaining an estimate of an environmental light source summary of the physical environment based on the image data frame; generating, from the image data frame and the estimate of the environmental light source summary, estimated values for one or more optical parameters of a surface within the physical environment, wherein the surface corresponds to at least a portion of the image data frame; and presenting a computer-generated reality (CGR) environment including the surface based at least in part on the estimated values for the one or more optical parameters of the surface and CGR content.

In accordance with some implementations, an electronic device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of an electronic device, cause the electronic device to perform or cause performance of any of the methods described herein. In accordance with some implementations, an electronic device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more CGR objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of CGR object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real-world objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include near-eye systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A near-eye system may have one or more speaker(s) and an integrated opaque display. Alternatively, a near-eye system may be configured to accept an external opaque display (e.g., a smartphone). The near-eye system may incorporate one or more imaging sensors to capture images or video of the physical environment, and/or one or more microphones to capture audio of the physical environment. Rather than an opaque display, a near-eye system may have a transparent or translucent display. The display may utilize digital light projection, micro-electromechanical systems (MEMS), digital micromirror devices (DMDs), organic light-emitting diodes (OLEDs), light-emitting diodes (LEDs), micro-light-emitting diodes (µLEDs), liquid crystal on silicon (LCoS), laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example image processing system 100 in accordance with some implementations. In various implementations, the example image processing system 100 or portions thereof are included in an electronic device 420 shown in FIGS. 4A, 4B, and 8; a controller 403 shown in FIGS. 4A, 4B, and 7; or a suitable combination thereof. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in some implementations, the example image processing system 100 includes at least a material database 103, an environmental light source database 105, a CGR content database 104, a training engine 111, an image sensor 101, a buffer 123, a switch 108, an optical parameter estimation engine 115, an environmental light source summary engine 129, and a CGR presentation engine 119. In some implementations, the training engine 111 includes at least a training data generator 107, a training dataset 109, and an adjustment unit 112. In some implementations, the optical parameter estimation engine 115 includes at least a neural network 131 and a comparison engine 133.

In some implementations, in a training mode, the example image processing system 100 is configured to generate the training dataset 109 including training data based at least in part on the material database 103 and the environmental light source database 105. For example, the training data at least includes a computer-generated photorealistic image 136 (e.g., a training image) and known values 116 therefor. For example, the known values 116 include (i) target values for one or more optical parameters of a surface within the computer-generated photorealistic image 136 (e.g., the target values 204 shown in FIG. 2B), (ii) environmental light source parameters for the computer-generated photorealistic image 136 (e.g., the environmental light source parameters 208 shown in FIG. 2B), and (iii) surface shading parameters for the computer-generated photorealistic image 136 (e.g., the surface shading parameters 206 shown in FIG. 2B).

In some implementations, in the training mode, the neural network 131 is configured to generate the estimated values 117 for optical parameters of a surface within the computer-generated photorealistic image 136 from the training dataset 109. For example, the estimated values 117 include a first estimated value for an albedo optical parameter, a second estimated value for a reflectance optical parameter, and/or the like for the surface within the computer-generated photorealistic image 136. One of ordinary skill in the art will appreciate that the estimated values 117 may include one or more estimated values for one or more optical parameters. One of ordinary skill in the art will appreciate that the estimated values 117 may include two or more estimated values for two or more optical parameters.

In some implementations, in the training mode, the adjustment unit 112 is configured to generate the neural network parameters 113 (sometimes also referred to herein as "operating parameters") for adjusting the neural network 131 based on a loss value 114 from the comparison engine 133. For example, the loss value 141 at least corresponds to a comparison between the target values and the estimated values 117 for the optical parameters of the surface within the computer-generated photorealistic image 136. As such, in the training mode, the example image processing system 100 trains the neural network 131 (e.g., the neural network 131 shown in FIG. 6) or portions thereof to generate the estimated values 117 for surfaces within image data frames. The features and components of the image processing system 100 that are involved in the training mode are discussed in greater detail below with respect to the FIGS. 2A and 2B.

After the training engine 111 has trained the neural network 131, the trained neural network (e.g., the trained neural network 251 shown in FIG. 2C) may begin to operate in a run-time mode. In some implementations, the switch 108 toggles between the training mode and the run-time mode. In the training mode, the switch 108 is coupled to a second output terminal 108*b* (e.g., an open circuit). In the run-time mode, the switch 108 is coupled to the first output terminal 108*a* in order to output the image data frames from the image sensor 101 to the optical parameter estimation engine 115.

In some implementations, during the run-time mode, the optical parameter estimation engine 115 generates estimated values 117 for one or more surfaces within image data frames from the buffer 123, which are captured by the image sensor 101 (e.g., a live video stream). Thereafter, the CGR presentation engine 119 uses (A) the estimated values 117, (B) CGR content from the CGR content database 104, and (C) the image data frames from the image sensor 101 to generate a CGR environment 125 (e.g., the CGR environment 463*a* shown in FIG. 4A, or the CGR environment 463*b* shown in FIG. 4B). The features and components of the image processing system 100 that are involved in the run-time mode are discussed in greater detail below with respect to FIG. 2C.

Although the training engine 111, the training data generator 107, the adjustment unit 112, the buffer 123, the switch 108, the optical parameter estimation engine 115, the neural network 131, the comparison engine 133, the environmental light source summary engine 129, and the CGR presentation engine 119 are shown as residing on a single device (e.g., the image processing system 100), it should be understood that in other implementations, any combination of the training engine 111, the training data generator 107, the adjustment unit 112, the buffer 123, the switch 108, the optical parameter estimation engine 115, the neural network 131, the comparison engine 133, the environmental light source summary engine 129, and the CGR presentation engine 119 may be located in separate computing devices.

Moreover, FIG. 1 is intended more as functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 1 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 2A:
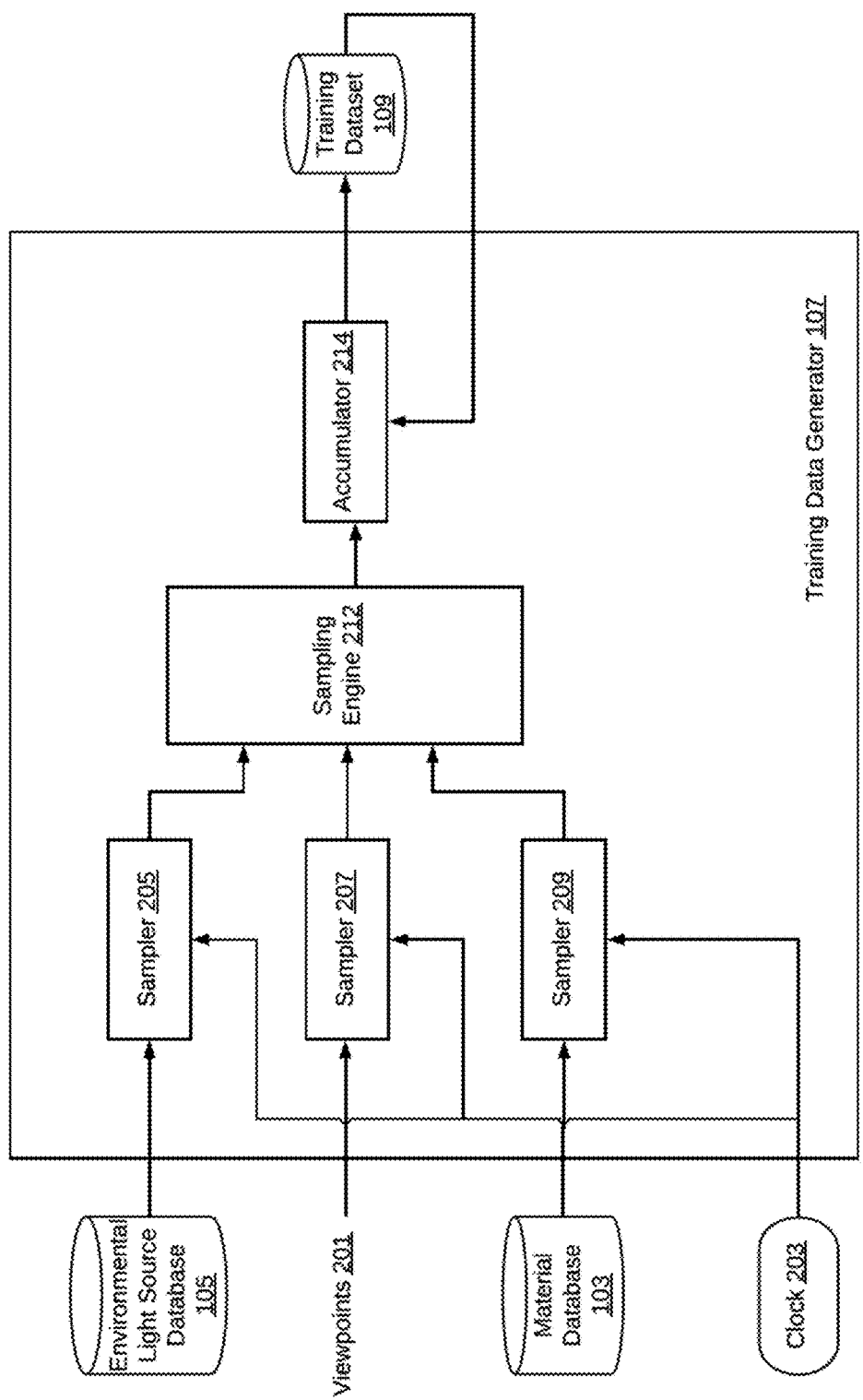
FIG. 2A is a block diagram for a training data generator shown in FIG. 1 in accordance with some implementations.

FIG. 2A is a block diagram of the training data generator 107 shown in FIG. 1 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. As a non-limiting example, in some implementations, the training data generator 107 generates the training dataset 109 based on a clock 203, the environmental light source database 105, the material database 103, and viewpoints 201. In some implementations, as shown in FIG. 2A, the training data generator 107 includes samplers 205, 207, 209, a sampling engine 212, and an accumulator 214.

In some implementations, the sampler 205 samples data from the environmental light source database 105 according to a clock signal received from the clock 203. In some implementations, the environmental light source database 105 includes surface shading parameters (e.g., the surface shading parameters 206 shown in FIG. 2B) and environmental light source parameters (e.g., the environmental light source parameters 208 shown in FIG. 2B) (sometimes also referred to herein as the "environmental light source summary").

In some implementations, the sampler 207 samples data from a plurality of viewpoints 201 according to a clock signal received from the clock 203. In some implementations, the viewpoints 201 contain data corresponding to different perspectives (e.g., camera poses) of different surfaces in the material database 103.

In some implementations, the sampler 209 samples data from the material database 103 according to a clock signal received from the clock 203. In some implementations, the material database 103 includes optical parameters (e.g., the target values 204 shown in FIG. 2B) for the different materials (e.g., stone, wood, metal, plastic, human skin, animal fur, leather, fruit skin, and/or the like).

In some implementations, the sampling engine 212 obtains sampled data from the samplers 205, 207, and 209 in order to generate training data. In some implementations, the sampling engine 212 generates the training data as a function of the result of sampling data from the environmental light source database 105, the viewpoints 201, and the material database 103. In some implementations, the sampling engine 212 generates computer-generated photo-realistic images of synthetic materials (e.g., computer-generated wood, metal, etc.).

In some implementations, the accumulator 214 collects the training data from the sampling engine 212. In some implementations, the accumulator 214 stores the computer-generated photorealistic images in the training dataset 109. In some implementations, the computer-generated photorealistic images are labeled based on the synthetic material types and known values for optical parameters thereof. In some implementations, the synthetic materials may correspond to different surfaces for inorganic materials such as metal, tile, plastic, or the like. In some implementations, the synthetic materials may correspond to different surfaces for organic materials such as wood, bark, human skin, fruit skin, animal fur, leather, or the like.

Figure 2B:
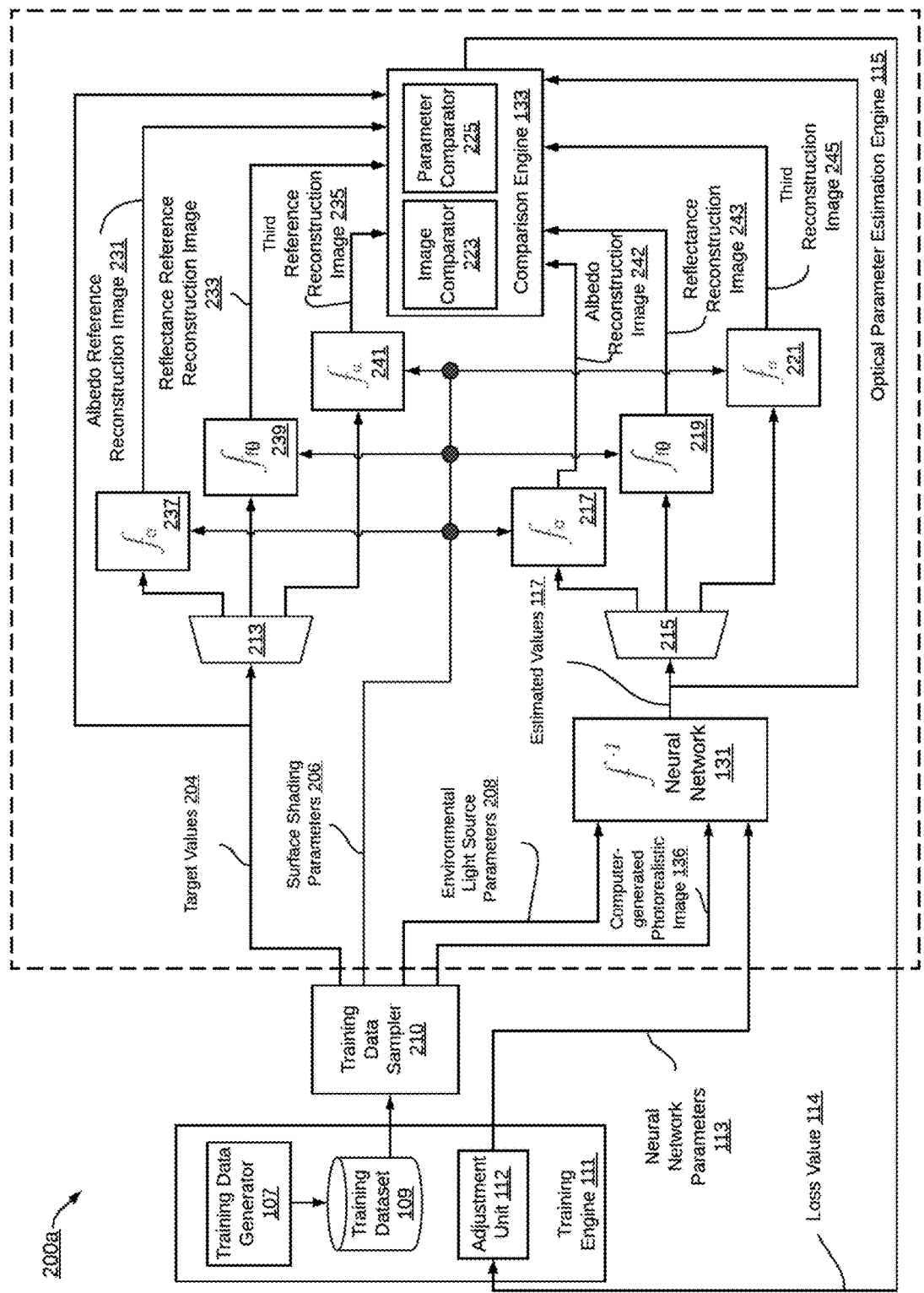
FIG. 2B is a block diagram of a training implementation of the image processing system shown in FIG. 1 in accordance with some implementations.

In some implementations, the training dataset 109 includes a corpus of training images including at least one computer-generated photorealistic image (e.g., the computer-generated photorealistic image 136 shown in FIGS. 1 and 2B). In some implementations, each training image within the training dataset 109 is annotated with known values for the optical parameters of surfaces therein (e.g., the target values 204 shown in FIG. 2B) and also with environmental light source summary (e.g., the environmental light source parameters 208 shown in FIG. 2B). In some implementations, the training dataset 109 is stored in a non-transitory memory that is local relative to the example image processing system 100. In some implementations, the training data 109 is stored in a non-transitory memory that is remote relative to the example image processing system 100.

Although the clock 203, the samplers 205, 207, 209, the sampling engine 212, and the accumulator 214 are shown as residing on a single device (e.g., the training data generator 107), it should be understood that in other implementations, any combination of the clock 203, the samplers 205, 207, and 209, the sampling engine 212, and the accumulator 214 may be located in separate computing devices.

Moreover, FIG. 2A is intended more as functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 2A could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 2B is a block diagram of a training implementation 200a of the image processing system 100 shown in FIG. 1 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the training implementation 200a of the image processing system 100 includes the training engine 111, a training data sampler 210, and the optical parameter estimation engine 115. According to some implementations, the optical parameter estimation engine 115 includes the neural network 131, a first demultiplexer (DEMUX) 213, a second DEMUX 215, a first sigma function module 237, a first theta function module 239, a first alpha function module 241, a second sigma function module 217, a second theta function module 219, a second alpha function module 221, and a comparison engine 133.

In some implementations, the training data sampler 210 obtains a training image (e.g., the computer-generated photorealistic image 136) and known values therefor (e.g., the target values 204, the surface shading parameters 206, and the environmental light source parameters 208) from the training dataset 109. In some implementations, each training iteration is based on the computer-generated photorealistic image 136 from the training dataset 109 and known values therefor. In some implementations, each training iteration is based on different computer-generated photorealistic images from the training dataset 109 and known values therefor.

In some implementations, the training data sampler 210 provides the target values 204 to the first DEMUX 213 and the comparison engine 133. In some implementations, the training data sampler 210 provides the surface shading parameters 206 to the first sigma function module 237, the second sigma function module 217, the first theta function module 239, the second theta function module 219, the first alpha function module 241, and the second alpha function module 221. In some implementations, the training data sampler 210 provides the environmental light source parameters 208 and the computer-generated photorealistic image 136 to the neural network 131, and, in turn, the neural network 121 generates the estimated values 117.

In some implementations, the first DEMUX 213 splits the target values 204 from the training data sampler 210 into a first target value for the albedo optical parameter, a second target value for the reflectance optical parameter, and a third value for the target third optical parameter. As such, the first DEMUX 213 routes the first target value for the albedo optical parameter to the first sigma function module 237, the second target value for the reflectance optical parameter to the first theta function module 239, and the third target value for the third optical parameter to the first alpha function module 241. Although, the training implementation 200a illustrates three target values for three different optical parameters, one of ordinary skill in the art will appreciate that the training implementation 200a may be designed for handling a single target value for a single optical parameter or two or more target values for two or more optical parameters.

In some implementations, the second DEMUX 215 splits the estimated values 117 from the neural network 131 into a first estimated value (e.g., the first estimated value 632 shown in FIG. 6) for the albedo optical parameter, a second estimated value (e.g., the second estimated value 634 shown in FIG. 6) for the reflectance optical parameter, and a third estimated value (e.g., the third estimated value 636 shown in FIG. 6) for the third optical parameter. Accordingly, the second DEMUX 215 routes the first estimated value for the albedo optical parameter to the second sigma function module 217, the second estimated value for the reflectance optical parameter to the second theta function module 219, and the third estimated value for the third optical parameter to the second alpha function module 221. In some implementations, a system controller or operating system (e.g., the operating system 830 shown in FIG. 8) manages the operation (or mode selection) of the first DEMUX 213 and/or the second DEMUX 215. Although, the training implementation 200a illustrates three estimated values for three different optical parameters, one of ordinary skill in the art will appreciate that the training implementation 200a may be designed for handling a single estimated value for a single optical parameter or two or more estimated values for two or more optical parameters.

In some implementations, the first sigma function module 237 and the second sigma function module 217 are associated with an albedo optical parameter. For example, the albedo optical parameters correspond to a ratio of the radiosity (e.g., emission plus reflectance) to the irradiance of a surface. In some implementations, the first sigma function module 237 generates an albedo reference reconstruction image 231 based at least in part on the surface shading parameters 206 and the first target value for the albedo optical parameter. In some implementations, the second sigma function module 217 generates an albedo reconstruction image 242 based at least in part on the surface shading parameters 206 and the first estimated value for the albedo optical parameter. Those skilled in the art will appreciate that there are many ways of generating reference reconstruction images such as a fast approximation of a function used to create the computer-generated photorealistic image 136. For the sake of brevity, an exhaustive listing of all such methods of generating the reference reconstruction images is not provided herein. Furthermore, those of ordinary skill in the art will also appreciate from the present disclosure that although the first sigma function module 237 and the second sigma function module 217 corresponds to an albedo optical parameter, the first sigma function 237 and the second sigma function module 237 can correspond to any other optical parameters of a surface that is independent of light source, orientation, and angle.

In some implementations, the first theta function module 239 and the second theta function module 219 are associated with a reflectance optical parameter. For example, the reflectance optical parameters correspond to a fraction of radiation reflected by the surface. In some implementations, the first theta function module 239 generates a reflectance reference reconstruction image 233 based at least in part on the surface shading parameters 206 and the second target value for the reflectance optical parameter. In some implementations, the second theta function module 219 generates a reflectance reconstruction image 243 based at least in part on the surface shading parameters 206 and the second estimated value for the reflectance optical parameter. Those skilled in the art will appreciate that there are many ways of generating reference reconstruction images such as a fast approximation of a function used to create the computer-generated photorealistic image 136. For the sake of brevity, an exhaustive listing of all such methods of generating the reference reconstruction images is not provided herein. Furthermore, those of ordinary skill in the art will appreciate from the present disclosure that although the first theta function module 239 and the second theta function module 219 corresponds to a reflectance optical parameter, the first theta function module 239 and the second theta function module 219 can correspond to any other optical parameter that is independent of light source, orientation, and angle.

In some implementations, the first alpha function module 241 and the second alpha function module 221 are associated with a third optical parameter. For example, the roughness optical parameter is a measure of surface texture. In some implementations, the first alpha function module 241 generates a third reference reconstruction image 235 based at least in part on the surface shading parameters 206 and the third target value for the third optical parameter. In some implementations, the second alpha function module 221 generates a third reconstruction image 245 based at least in part on the surface shading parameters 206 and the third estimated value for the third optical parameter. Those skilled in the art will appreciate that there are many ways of generating reference reconstruction images such as a fast approximation of a function used to create the computer-generated photorealistic image 136. For the sake of brevity, an exhaustive listing of all such methods of generating the reference reconstruction images is not provided herein. Furthermore, those of ordinary skill in the art will appreciate from the present disclosure that although the first alpha function module 241 and the second alpha function module 221 corresponds to a third optical parameter, the first alpha function module 241 and the second alpha function module 221 can correspond to any other optical parameter that is independent of light source, orientation, and angle.

In some implementations, the comparison engine 133 includes an image comparator 223 and a parameter comparator 225. In some implementations, the image comparator 223 compares the albedo reference reconstruction image 231 with the albedo reconstruction image 242 (e.g., pixel-wise comparison of RGB values, luminosity values, or the like). In some implementations, the image comparator 223 compares the reflectance reference reconstruction image 233 with the reflectance reconstruction image 243 (e.g., pixel-wise comparison of RGB values, luminosity values, or the like). In some implementations, the image comparator 223 compares the third reference reconstruction image 235 with the third reconstruction image 245 (e.g., pixel-wise comparison of RGB values, luminosity values, or the like). In some implementations, the parameter comparator 225 compares the target values 204 with the estimated values 117 for the one or more optical parameters of the surface.

In some implementations, the comparison engine 133 generates a loss value 114, wherein the loss value 114 is a result of a loss function that aggregates: (A) differences between the estimated values 117 and the target values 204 for the one or more optical parameters of the surface, and (B) differences between the pixels of the set of reconstruction images (e.g., the albedo reconstruction image 242, the reflectance reconstruction image 243, and the third reconstruction image 245) and the pixels of the set of reference reconstruction images (e.g., the albedo reference reconstruction image 231, the reflectance reference reconstruction image 233, and the third reference reconstruction image 235).

In some implementations, the training engine 111 includes the training data generator 107, the training dataset 109, and the adjustment unit 112. In some implementations, the adjustment unit 112 determines the neural network parameters 113 based at least in part on the loss value 114 from the comparison engine 133. In some implementations, the adjustment unit 112 determines and provides the neural network parameters 113 (e.g., filter/neural weights) in order to adjust the input, hidden, and/or output layers associated with the neural network 131. The features and components involved in adjusting operating parameters of the neural network 131 are further described in method 300 shown in FIG. 3. The layers of the neural network 131 are further described below with reference to FIG. 6.

Moreover, FIG. 2B is intended more as functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 2B could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 2C:
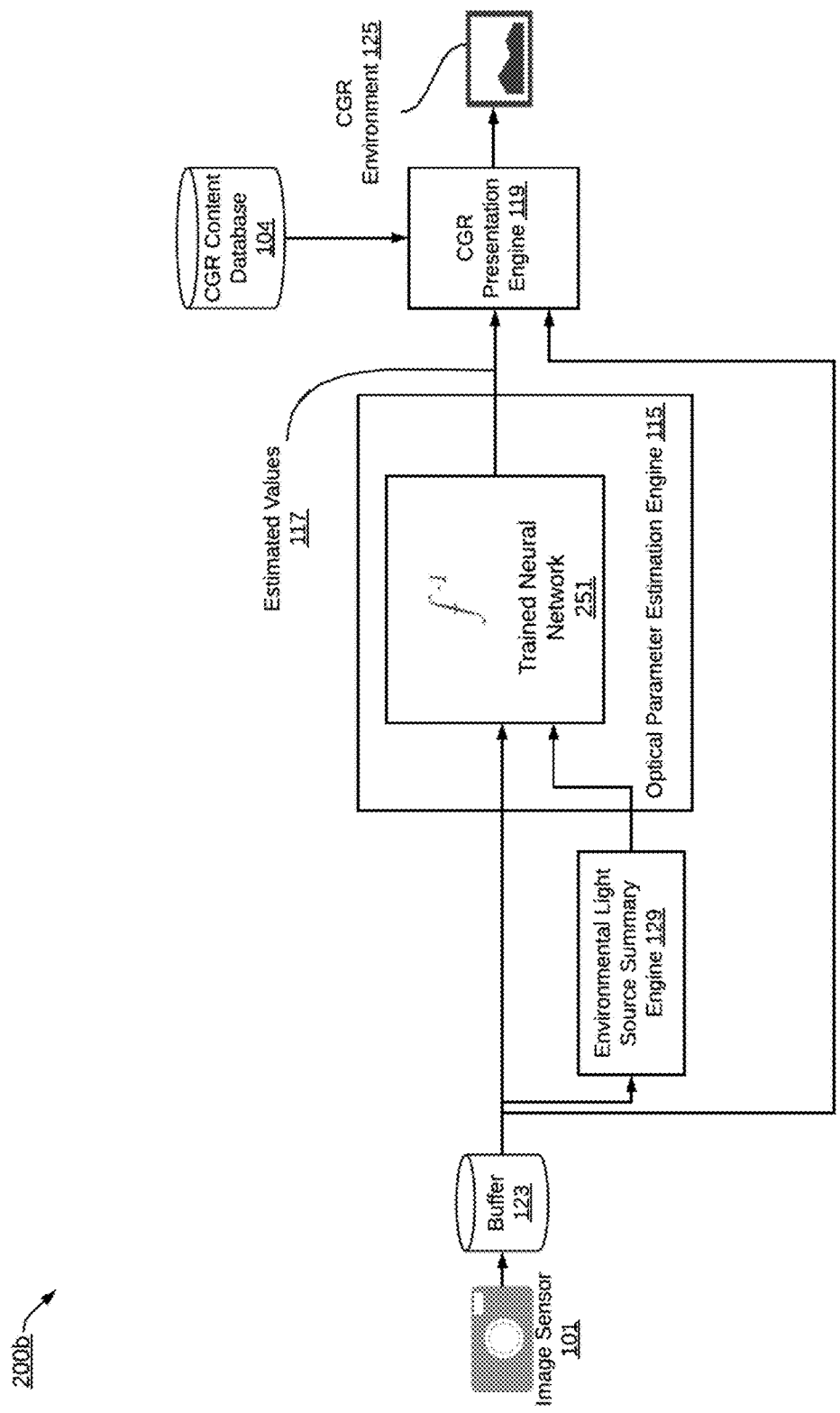
FIG. 2C is a block diagram of a run-time implementation of the image processing system shown in FIG. 1 in accordance with some implementations.

FIG. 2C is a block diagram of a run-time implementation 200b of the image processing system 100 shown in FIG. 1 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the run-time implementation 200b of the image processing system 100 includes the image sensor 101, the buffer 123, the environmental light source summary engine 129, the optical parameter estimation engine 115, the CGR content database 104, and the CGR presentation engine 119. According to some implementations, in the run-time implementation 200b, the optical parameter estimation engine 115 includes a trained neural network 251.

In some implementations, the image sensor 101 (e.g., one or more image sensors) is provided to capture image data frames of a physical environment. In some implementations, the image data frames captured by the image sensor 101 are stored in the buffer 123 (e.g., a non-transitory memory), which is accessible to the optical parameter estimation engine 115 and the environmental light source summary engine 129.

In some implementations, the environmental light source summary engine 129 is configured to generate environmental light source summary from the image data frames obtained from the image sensor 101. For example, the environmental light source summary may include light source conditions and/or surface shading parameters that are present in the image data frame.

In some implementations, in the run-time implementation 200b, the image processing system 100 generates estimated values 117 for optical parameters of surfaces within the image data frames. To that end, the optical parameter estimation engine 115 includes a trained neural network 251 that generates the estimated values 117 for optical parameters of surfaces within an image data frame based on the image data frame and the environmental light source summary from the environmental light source summary engine 129. For example, the estimated values 117 include a first estimated value for an albedo optical parameter (e.g., the first estimated value 632 shown in FIG. 6), a second estimated value for a third optical parameter (e.g., the second estimated value 634 shown in FIG. 6), a third estimated value for a reflectance optical parameter (e.g., the third estimated value 636 shown in FIG. 6), and/or the like for a surface within at least a portion of the image data frame from the image sensor 101.

In some implementations, the surface within the image data frame may correspond to the surface of inorganic objects (e.g., tabletops, upholstery, or the like) and/or organic objects (e.g., human skin, fruit, animals, or the like) within at least a portion of the image data frame. In some implementations, the optical parameter estimation engine 115 may perform pre-processing steps such as identifying a plurality of surfaces within image data frames based on plane estimation within the image data frame, object recognition (e.g., based on instance or semantic segmentation), or the like. In some implementations, the optical parameter estimation engine 115 may identify multiple surfaces and multiple objects within the image data frame. To that end, the optical parameter estimation engine 115 generates estimated values 117 for optical parameters of the multiple surfaces identified within the image data frame in parallel.

Figure 8:
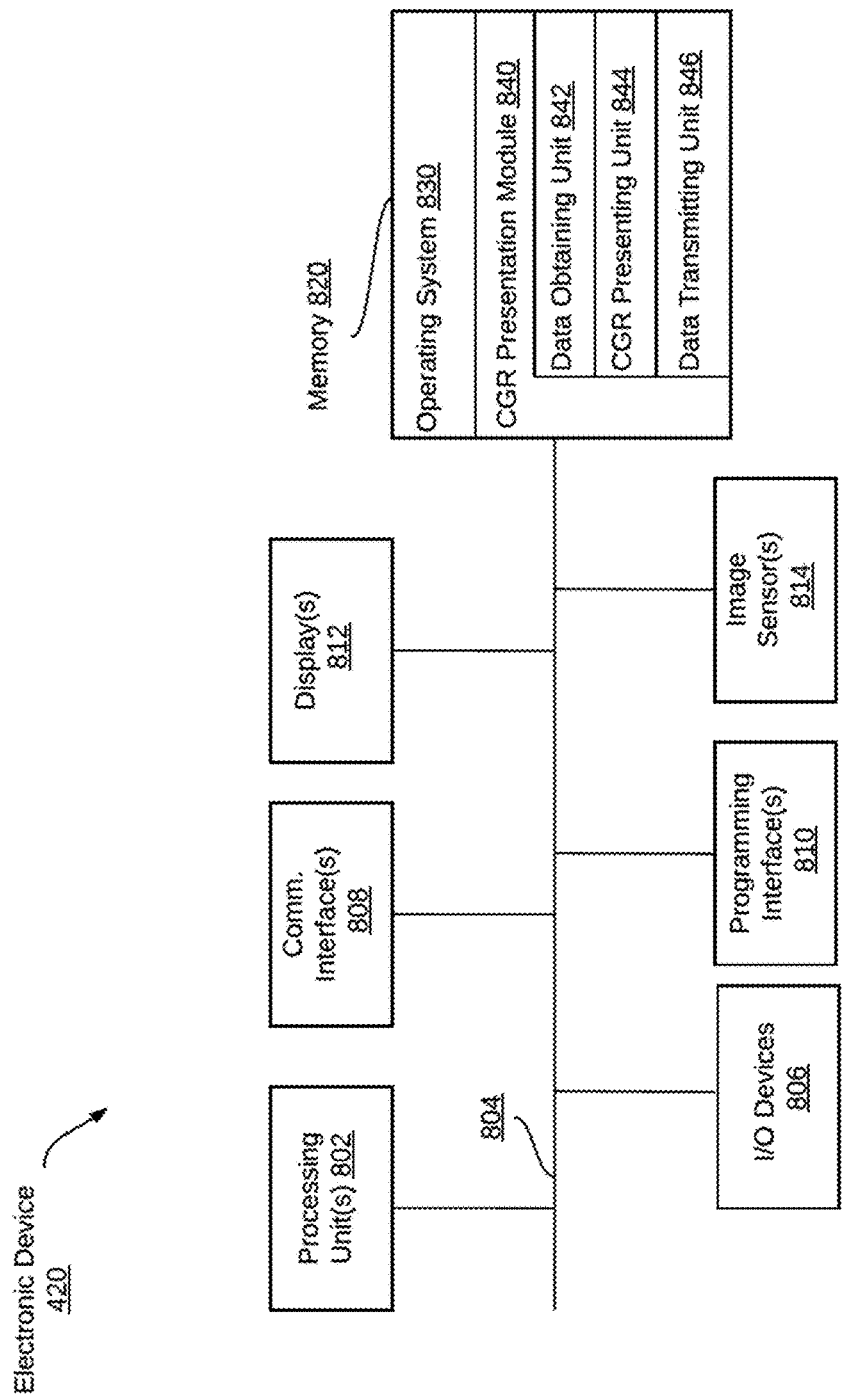
FIG. 8 is a block diagram of an example electronic device in accordance with some implementations.

In some implementations, the CGR presentation engine 119 is configured to render and cause presentation (e.g., via one or more displays 812 of the electronic device 420 shown in FIG. 8) of the CGR environment 125 based on the (A) estimated values 117 for the surface within the image data frame, (B) the CGR content from the CGR content database 104, and (C) the image data frame from the buffer 123. In some implementations, the CGR environment 125 includes video pass-through or optical see through of a physical environment (e.g., associated with the image data frames from the image sensor 101) composited with CGR content from the CGR content database 104. In some implementations, the CGR environment 125 includes one or more CGR light sources (e.g., a CGR lamp 426 shown in FIG. 4A) and/or one or more CGR objects (e.g., a CGR dining table 428 shown in FIG. 4B). In some implementations, the CGR content database 104 includes data corresponding to CGR light sources (e.g., the CGR lamp 426 shown in FIG. 4A), CGR objects (e.g., the CGR dining table 428 shown in FIG. 4B), other CGR items, CGR avatars, and/or the like. The features and components involved in generating the CGR environment 125 using the estimated values 117 are further described in method 500 shown in FIG. 5.

Moreover, FIG. 2C is intended more as functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 2C could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
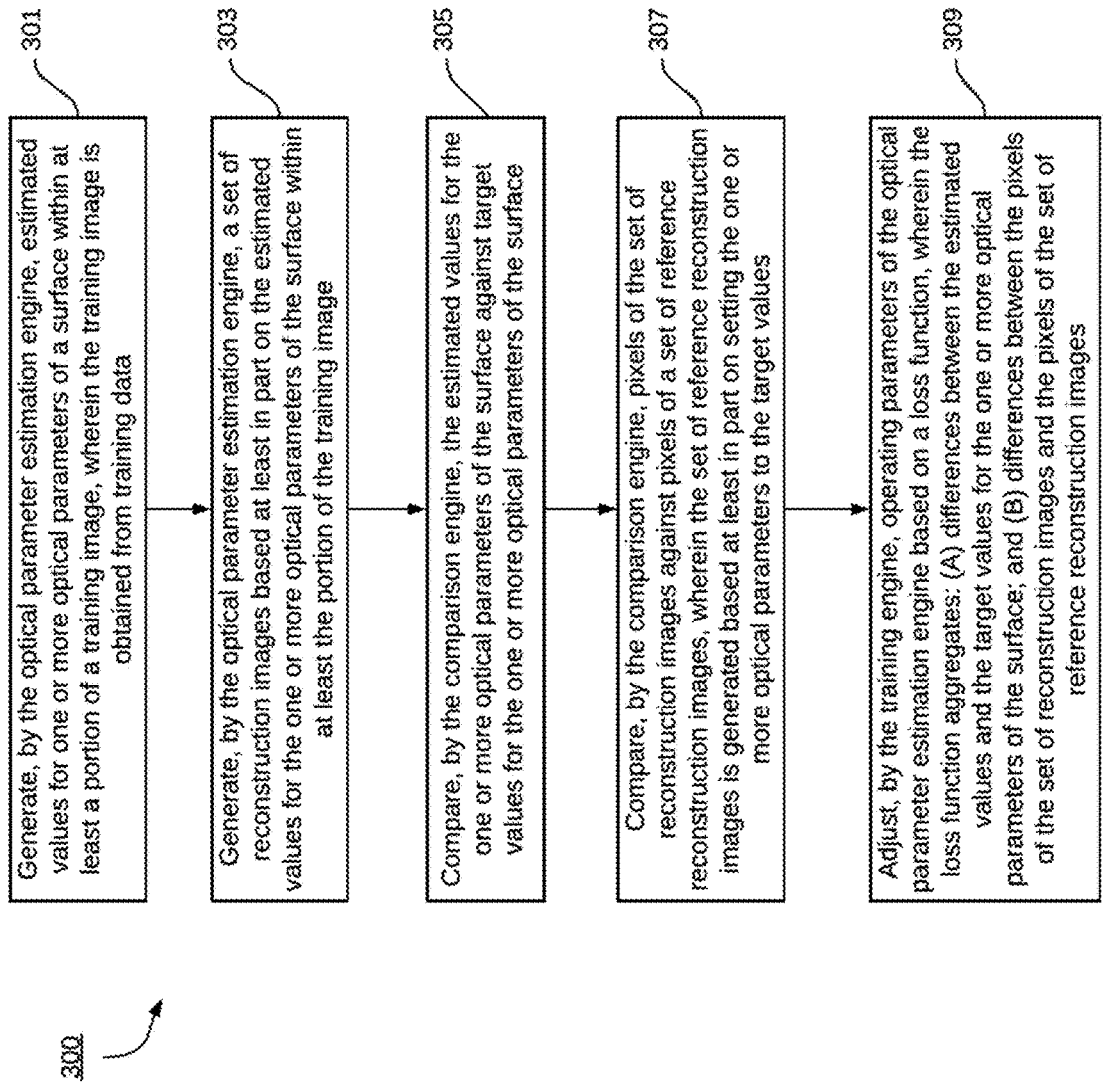
FIG. 3 is a flowchart representation of a method of training a neural network in accordance with some implementations.

FIG. 3 is a flowchart representation of a method 300 of training a neural network in accordance with some implementations. In some implementations, the method 300 is performed at an image processing system (e.g., the training implementation 200a of the image processing system 100 shown in FIG. 2B) including a training engine (e.g., the training engine 111 shown in FIGS. 1 and 2B), a comparison engine (e.g., the comparison engine 133 shown in FIGS. 1 and 2B), and an optical parameter estimation engine (e.g., the optical parameter estimation engine 115 shown in FIGS. 1 and 2B). In some implementations, the method 300 is performed by an electronic device (e.g., the electronic device 420 shown in FIGS. 4A, 4B, and 8; the controller 403 shown in FIGS. 4A, 4B, and 7; or a suitable combination thereof) with one or more processors and a non-transitory memory. In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 301, the method 300 includes generating, by the optical parameter estimation engine (e.g., the optical parameter estimation engine 115 shown in FIGS. 1 and 2B), estimated values (e.g., the estimated values 117 shown in FIGS. 1 and 2B) for one or more optical parameters of a surface within at least a portion of a training image, wherein the training image is obtained from training data. As a non-limiting example, the surface may correspond to an inorganic material such as metal, plastic, stone, or the like. As another non-limiting example, the surface may correspond to an organic material such as human skin, fruit, animal fur, leather, or the like. One of ordinary skill in the art will appreciate that many optical parameters may be accounted for such as albedo, reflectance, roughness, and/or the like.

In some implementations, the optical parameter estimation engine includes a neural network (e.g., the neural network 131 shown in FIG. 2B). In some implementations, the neural network corresponds to a convolutional neural network (CNN), recurrent neural network (RNN), a deep neural network (DNN), or the like. For example, as shown in FIG. 2B, an output from the neural network 131 corresponds to the estimated values 117 (e.g., the first estimated value 632, the second estimated value 634, or the third estimated value 636 shown in FIG. 6).

In some implementations, the training image corresponds to a computer-generated photorealistic image (e.g., the computer-generated photorealistic image 136 shown in FIG. 2B). In some implementations, the training data includes at least: the computer-generated photorealistic image (e.g., the computer-generated photorealistic image 136 shown in FIG. 2B), target values (e.g., the target values 204 shown in FIG. 2B) for the one or more optical parameters of the surface within the computer-generated photorealistic image, an environmental light source summary (e.g., the environmental light source parameters 208 shown in FIG. 2) associated with the computer-generated photorealistic image, and surface shading parameters (e.g., the surface shading parameters 206 shown in FIG. 2B) associated with the computer-generated photorealistic image. In some implementations, the method 300 further includes generating the training image based on sampling data from at least one of the environmental light source database (e.g., the environmental light source database 105 shown in FIG. 2A), a plurality of viewpoints (e.g., viewpoints 201 shown in FIG. 2A), or the material database (e.g., the material database 103 shown in FIG. 2A).

In some implementations, as a non-limiting example, the optical parameters correspond to at least one of an albedo optical parameter, a reflectance optical parameter, and a third optical parameter. For example, the albedo optical parameter corresponds to a ratio of the radiosity (e.g., emission plus reflectance) to the irradiance of a surface. As shown in FIG. 2B, the first sigma function module 237 and a second sigma function module 217 are associated with the albedo optical parameter. For example, the reflectance optical parameter corresponds to a fraction of radiation reflected by the surface. As shown in FIG. 2B, the first theta function module 239 and the second theta function module 219 are associated with the reflectance optical parameter. For example, the third optical parameter corresponds to the texture of the surface. As shown in FIG. 2B, the first alpha function module 241 and the second alpha function module 221 are associated with the third optical parameter.

Those of ordinary skill in the art will appreciate from the present disclosure that although the optical parameters are described as an albedo optical parameter, a reflectance optical parameter, and a third optical parameter, this is not an exhaustive listing of all the optical parameters that the optical parameter estimation engine may be trained to estimate from an image. Those skilled in the art will appreciate that there are many other optical parameters that the optical parameter estimation engine can estimate.

As represented by block 303, the method 300 includes generating, by the optical parameter estimation engine, a set of reconstruction images based at least in part on the estimated values for the one or more optical parameters of the surface within at least the portion of the training image. In some implementations, a first reconstruction image from among the set of reconstruction image corresponds to a first optical parameter from among the optical parameters, and a second reconstruction image from among the set of reconstruction images corresponds to a second optical parameter from among the optical parameters. For example, with reference to FIG. 2B, the set of reconstruction images includes an albedo reconstruction image 242, a reflectance reconstruction image 243, and a third reconstruction image 245.

As represented by block 305, the method 300 includes comparing, by the comparison engine, the estimated values for the one or more optical parameters of the surface against target values for the one or more optical parameters of the surface. For example, as shown in FIG. 2B, the parameter comparator 225 compares the estimated values 117 against the target values 204.

As represented by block 307, the method 300 includes comparing, by the comparison engine, pixels of the set of reconstruction images against pixels of a set of reference reconstruction images, wherein the set of reference reconstruction images is generated based at least in part on setting the one or more optical parameters to the target values (e.g., the target values 204 shown in FIG. 2B). In some implementations, the comparison engine performs a pair-wise comparison of the red, green, blue (RGB) values between the pixels of the set of reconstruction images and the pixels of the set of reference reconstruction images. For example, as shown in FIG. 2B, the image comparator 223 may compare RGB values between a pixel from the albedo reference reconstruction image 231 against a pixel from the albedo reconstruction image 242. In some implementations, the comparison engine performs a pair-wise comparison of luminosity values between the pixels of the set of reconstruction images and the pixels of the set of reference reconstruction images. For example, as shown in FIG. 2B, the image comparator 223 may compare luminosity values between a pixel from the albedo reference reconstruction image 231 against a pixel from the albedo reconstruction image 242. Those of ordinary skill in the art will appreciate from the present disclosure that although the RGB values and the luminosity values are described, this is not an exhaustive listing of all the pixel characteristics that the image comparator 223 may compare.

For example, as shown in FIG. 2B, the set of reference reconstruction images includes an albedo reference reconstruction image 231, a reflectance reference reconstruction image 233, and a third reference reconstruction image 235. In some implementations, the optical parameter estimation engine 115 generates reference reconstruction images (e.g., the albedo reference reconstruction image 231, the reflectance reference reconstruction image 233, and the third reference reconstruction image 235 shown in FIG. 2B) by evaluating a real-time rendering approximation of a micro-facet scattering function at each pixel. Micro-facet scattering functions describe how light scatters from a rough surface. In micro-facet scattering models, a details microsurface is replaced by a simplified macrosurface with a modified scattering function that matches the aggregate directional scattering of the microsurface. In some implementations, the real-time rendering approximation is performed for a surface and a sub-surface of a real-world object (e.g., the fur (surface) of an animal and the skin or scalp (sub-surface) of the animal).

As represented by block 309, the method 300 includes adjusting, by the training engine, operating parameters of the optical parameter estimation engine based on a loss function, where the loss function aggregates: (A) differences between the estimated values and the target values for the one or more optical parameters of the surface; and (B) differences between the pixels of the set of reconstruction images and the pixels of the set of reference reconstruction images. In some implementations, the training engine or a component thereof (e.g., the adjustment unit 112 shown in FIGS. 1 and 2B) adjusts operating parameters of the neural network 131 based at least in part on the loss value from the comparison engine that is the result of the loss function. For example, as shown in FIG. 2B, the comparison engine 133 determines the loss value 114 based on the loss function. Continuing with this example, as shown in FIG. 2B, the adjustment unit 112 adjusts neural network parameters 113 based on the loss value 114 calculated by the comparison engine 133.

In some implementations, adjusting the optical parameter estimation engine includes adjusting filter weights associated with one or more layers of the neural network (e.g., input, hidden, and/or output layers) in order to reduce the loss function across a plurality of image data frames. The training engine sums the loss values in order to generate a total loss value. The total loss value (e.g., a scalar) is used to then adjust the filter weights associated with layers of the neural network.

Figure 6:
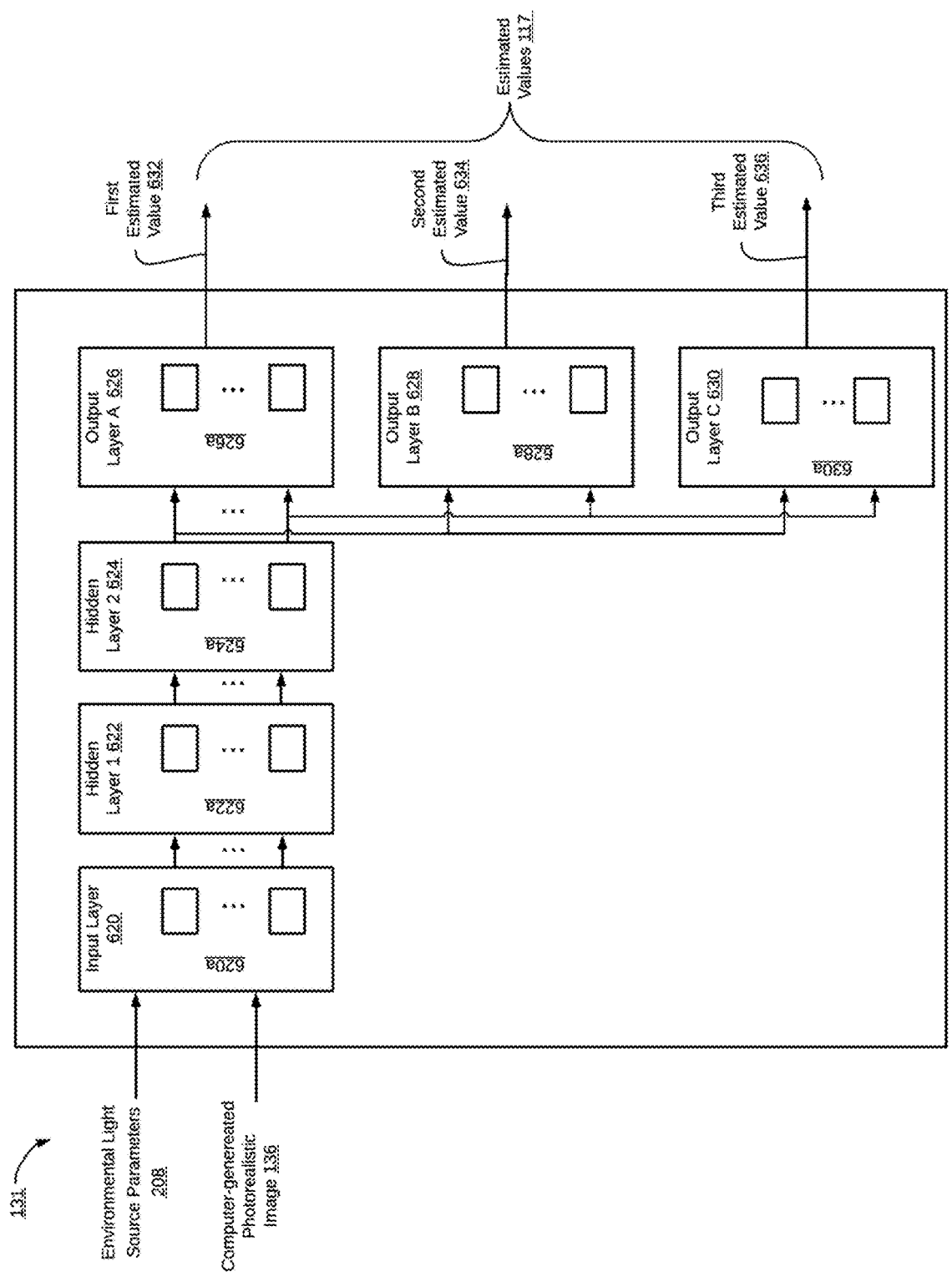
FIG. 6 is a block diagram of an example neural network in accordance with some implementations.

In some implementations, the method 300 includes adjusting weights for one of the output layers (e.g., output layer A 626, output layer B 628, or output layer C 630 shown in FIG. 6) in isolation in order to reduce the loss value associated with the loss function. The loss function maps values of one or more variables onto a real number that represents a "cost" associated with those values. In machine learning, at a high level, backpropagation is a technique used to determine the error between a guess and a correct solution by sending the result of a computation back to a parent recursively. To that end, the training steps include calculating the gradient (e.g., differentiation) and then performing backpropagation that integrates the gradient to obtain the way the weights should change. In some implementations, the loss function calculates the difference between the output (e.g., the estimated values 117 shown in FIG. 2B) and its expected output (e.g., the target values 204 shown in FIG. 2B), after a training image has propagated through the neural network (e.g., the neural network 131).

To that end, the method 300 includes disentangling the one or more optical parameters by adjusting portions of the neural network associated with a particular optical parameter in isolation while the other portions of the neural network associated with the optical parameters are kept constant. The disentanglement process allows the image processing system to isolate the effect of adjusting each portion of the neural network associated with the particular optical parameter. For example, as shown in FIG. 2B, the adjustment unit 112 adjusts a portion of the neural network for one of the albedo optical parameter, the reflectance optical parameter, or the third optical parameter in parallel paths.

As such, for example, the method 300 includes adjusting a first portion of the neural network associated with an albedo optical parameter (e.g., the output layer A 626 shown in FIG. 6) while keeping the other portions of the neural network associated with a reflectance optical parameter (e.g., the output layer B 628 shown in FIG. 6) and a third optical parameter constant (e.g., the output layer C 630 shown in FIG. 6). In some implementations, the method 300 includes adjusting a second portion of the neural network associated with the reflectance optical parameter (e.g., the output layer B 628 shown in FIG. 6) while keeping the other portion of the neural network associated with the albedo optical parameter (e.g., the output layer A 626 shown in FIG. 6) and the third optical parameter constant (e.g., the output layer C 630 shown in FIG. 6). In some implementations, the 300 includes adjusting a third portion of the neural network associated with the third optical parameter (e.g., the output layer C 630 shown in FIG. 6) while keeping the other portions of the neural network associated with the albedo optical parameters (e.g., the output layer A 626 shown in FIG. 6) and the reflectance optical parameter (e.g., the output layer B 628 shown in FIG. 6) constant. This enables a regularization of the learning process with disentangled reconstructions of a single optical parameter.

The disentanglement of optical parameters also allows the image processing system to calculate reconstruction errors with the reconstruction images (e.g., the albedo reconstruction image 242, the reflectance reconstruction image 243, and the third reconstruction image 245 shown in FIG. 2B) and to back-propagate the errors weights in order to adjust the weights and bias for each optical parameter accordingly. As mentioned above, the goal of back-propagation is to update each of the weights in the neural network so that the optical parameter estimation engine causes the output of the neural network (e.g., the estimated values 117 shown in FIG. 2B) to be closer to the target output (e.g., the target values 204 shown in FIG. 2B). This enables a reduction in the error for each optical parameter and the neural network (e.g., the neural network 131 shown in FIG. 2B) as a whole.

In some implementations, the method 300 includes implementing a regularizer for each optical parameter in order to verify each optical parameter independently and improve the performance of the neural network (e.g., the neural network 131 shown in FIGS. 1 and 2B). In some implementations, the adjustment step is additive such that each adjustment step can be one step or multiple steps per loss function. For example, it may be faster for performance reasons to perform all the steps in one step so that the system can sum the multiple losses and adjust the parameters at once.

In some implementations, the method 300 further includes performing the series of steps of 301, 303, 305, and 307 on multiple independent surfaces that are recognized within the training image in parallel. To that end, the method 300 further includes generating, by the optical parameter estimation engine, a second set of estimated values for a second set of one or more optical parameters of a second surface within at least a portion of the training image, wherein the second surface is different from the surface.

Figure 4A:
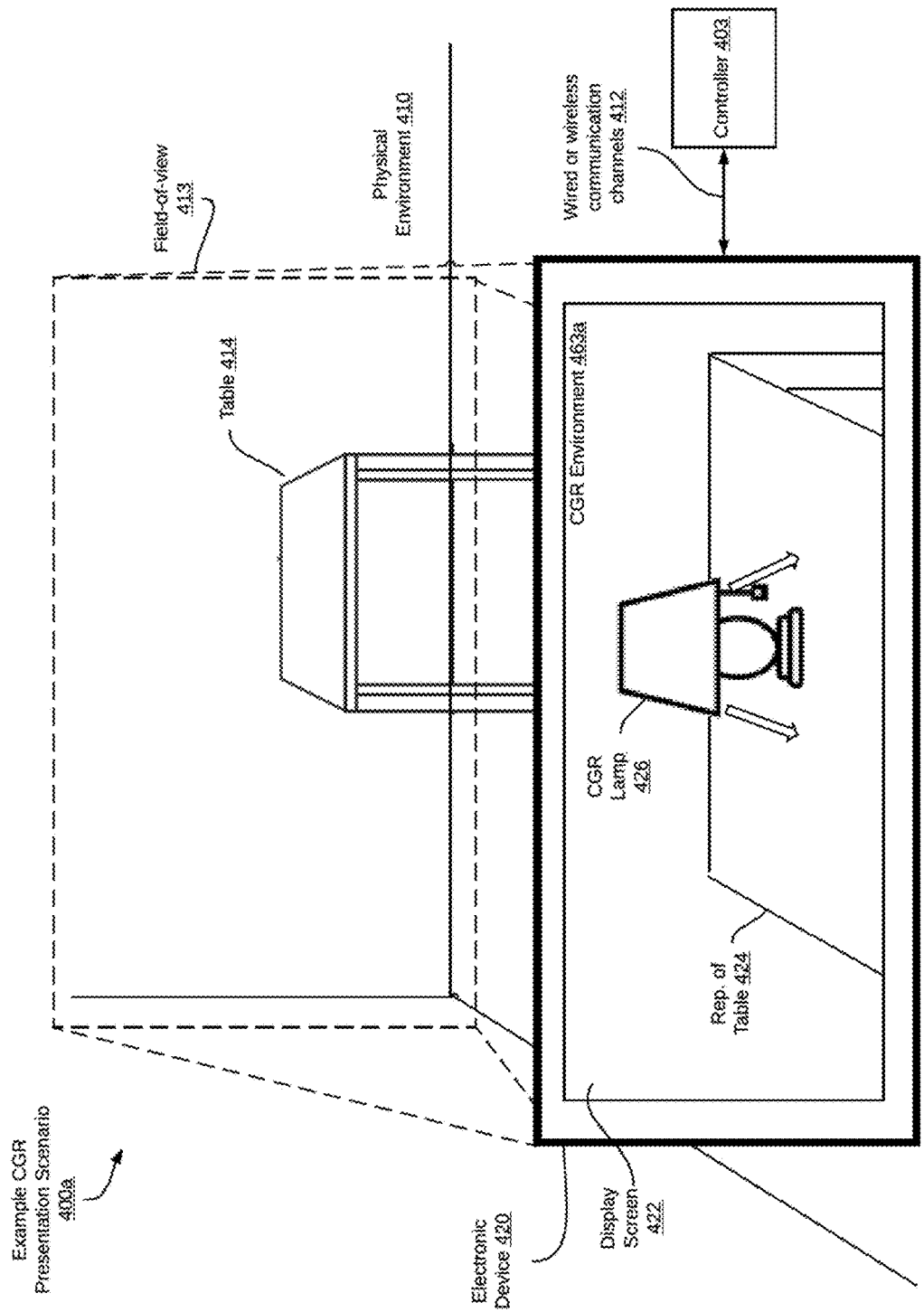
FIG. 4A illustrates an example computer-generated reality (CGR) presentation scenario that includes a CGR light source changing an appearance of a representation of a real-world surface in accordance with some implementations.

FIG. 4A illustrates an example CGR presentation scenario 400a that includes a CGR light source changing an appearance of a real-world surface in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

In the example CGR presentation scenario 400a, at least a portion of a physical environment 410 is within the field-of-view 413 of an external-facing image sensor of an electronic device 420 (e.g., a laptop, tablet, mobile phone, near-eye system, or the like). As shown in FIG. 4A, the physical environment 410 includes a table 414. However, in FIG. 4A, the electronic device 420 displays, on a display screen 422, a CGR environment 463a that includes a representation 424 of the table 414 and a CGR lamp 426 (e.g., a CGR light source). As shown in FIG. 4A, the CGR light source associated with the CGR lamp 426 will affect the appearance of the representation 424 of the table 414 due to additional light incident on the representation 424 of the table 414 (e.g., the additional light incident is not present in the physical environment 410). While pertinent features are shown, those of ordinary skill in the art will appreciate from the present disclosure that various other features have not been illustrated for the sake of brevity and so as not to obscure more pertinent aspects of the example implementations disclosed herein.

In some implementations, the image processing system 100 shown in FIG. 1 or a component thereof (e.g., the image sensor 101 shown in FIG. 1) obtains an image data frame of the physical environment 410 that includes the table 414. In some implementations, the image processing system 100 shown in FIG. 1 or a component thereof (e.g., the environmental light source summary engine 129 shown in FIGS. 1 and 2C) determines an environmental light source summary associated with the image data frame in order to determine the light source conditions that are already present within the physical environment 410. In some implementations, the image processing system 100 shown in FIG. 1 or a component thereof (e.g., the optical parameter estimation engine 115 shown in FIGS. 1 and 2C) generates estimated values for optical parameters of the table 414. As mentioned above, in some implementations, the image processing 110 is included in whole or in part in the electronic device 420, the controller 403, and/or a suitable combination thereof.

In some implementations, the image processing system 100 or a component thereof (e.g., the CGR presentation engine 119 shown in FIGS. 1 and 2C) synthesizes the representation 424 of the table 414 at least in part on light propagation from the CGR lamp 426 onto the representation 424 of the table 414, wherein the light propagation is determined based at least in part on the estimated values for the one or more optical parameters for the table 414 and the environmental light source summary of the physical environment 410. In some implementations, the controller 403 synthesizes and renders the CGR environment 463a. In some implementations, the electronic device 420 presents, on the display screen 422, the CGR environment 463a including the CGR lamp 426 and a representation 424 of the table 414.

In some implementations, the electronic device 420 corresponds to a pair of AR glasses with CGR content displayed thereon, a mobile phone with CGR content displayed thereon, or a near-eye system with CGR content displayed thereon. In some implementations, the functions and/or components of the controller 403 are combined with or provided by the electronic device 420.

In some implementations, the controller 403 includes a suitable combination of software, firmware, and/or hardware. The controller 403 is described in greater detail below with respect to FIG. 7. In some implementations, the controller 403 is a computing device that is local or remote relative to a physical environment 410. For example, the controller 403 is a local server situated within the physical environment 410. In another example, the controller 403 is a remote server situated outside of the physical environment 410 (e.g., a cloud server, central server, etc.). In some implementations, the controller 403 is communicatively coupled with the CGR device (e.g., the electronic device 420 shown in FIG. 8) via one or more wired or wireless communication channels 412 (e.g., BLUETOOTH, Institute of Electrical and Electronics Engineers (IEEE) 802.11x, IEEE 802.16x, IEEE 802.3x, etc.).

Figure 4B:
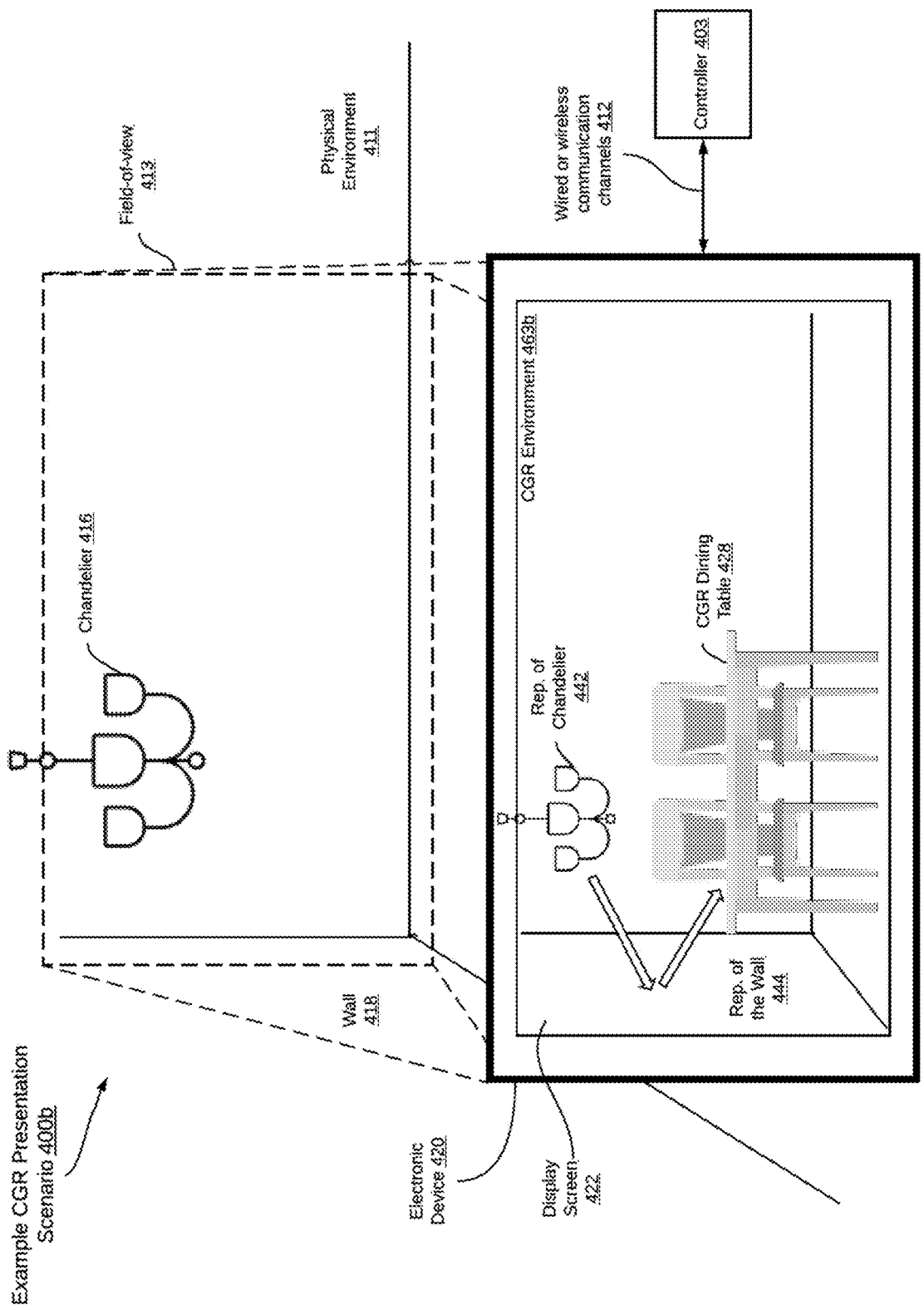
FIG. 4B illustrates an example CGR presentation scenario that includes a real-world light source reflected off a real-world surface changing an appearance of a surface of a CGR object in accordance with some implementations.

FIG. 4B illustrates an example CGR presentation scenario 400b that includes a real-world light source reflected off a real-world surface changing an appearance of a surface of a CGR object in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

In the example CGR presentation scenario 400b, at least a portion of a physical environment 411 is within the field-of-view 413 of an external-facing image sensor of the electronic device 420 (e.g., a laptop, tablet, mobile phone, or the like). In comparison to FIG. 4A, the physical environment 411 includes a chandelier 416 that corresponds to a real-world light source and a portion of a wall 418. As shown in FIG. 4B, the electronic device 420 displays, on the display screen 422, a CGR environment 463b that includes a representation 442 of the chandelier 416, a representation 444 of the wall 418, and a CGR dining table 428. As shown in FIG. 4B, the light source from the chandelier 416 will bounce off the wall 418 and affect a surface of the CGR dining table 428. While pertinent features are shown, those of ordinary skill in the art will appreciate from the present disclosure that various other features have not been illustrated for the sake of brevity and so as not to obscure more pertinent aspects of the example implementations disclosed herein.

In some implementations, the image processing system 100 shown in FIG. 1 or a component thereof (e.g., the image sensor 101 in FIG. 1) obtains an image data frame of the physical environment 411 that includes the chandelier 416 and the portion of the wall 418. In some implementations, the image processing system 100 shown in FIG. 1 or a component thereof (e.g., the environmental light source summary engine 129 shown in FIGS. 1 and 2C) determines environmental light source summary associated with the image data frame in order to determine the light source conditions that are already present within the physical environment 411. In some implementations, the image processing system 100 shown in FIG. 1 or a component thereof (e.g., the optical parameter estimation engine 115 shown in FIGS. 1 and 2C) generates estimated values for optical parameters of the wall 418. As mentioned above, in some implementations, the image processing 110 is included in whole or in part in the electronic device 420, the controller 403, and/or a suitable combination thereof.

In some implementations, the image processing system 100 or a component thereof (e.g., the CGR presentation engine 119 shown in FIGS. 1 and 2C) synthesizes the CGR dining table 428 based on light propagation from the real-world light source (e.g., the chandelier 416) reflected off the wall 418 onto a surface of the CGR dining table 428, wherein the light propagation is determined based at least in part on the estimated values for the one or more optical parameters for the wall 418 and the environmental light source summary of the physical environment 411. In some implementations, the controller 403 synthesizes and renders the CGR environment 463b. In some implementations, the electronic device 420 presents, on the display screen 422, the CGR environment 463b including the CGR dining table 428, the representation of the chandelier 442, and the representation of the wall 444.

Figure 5:
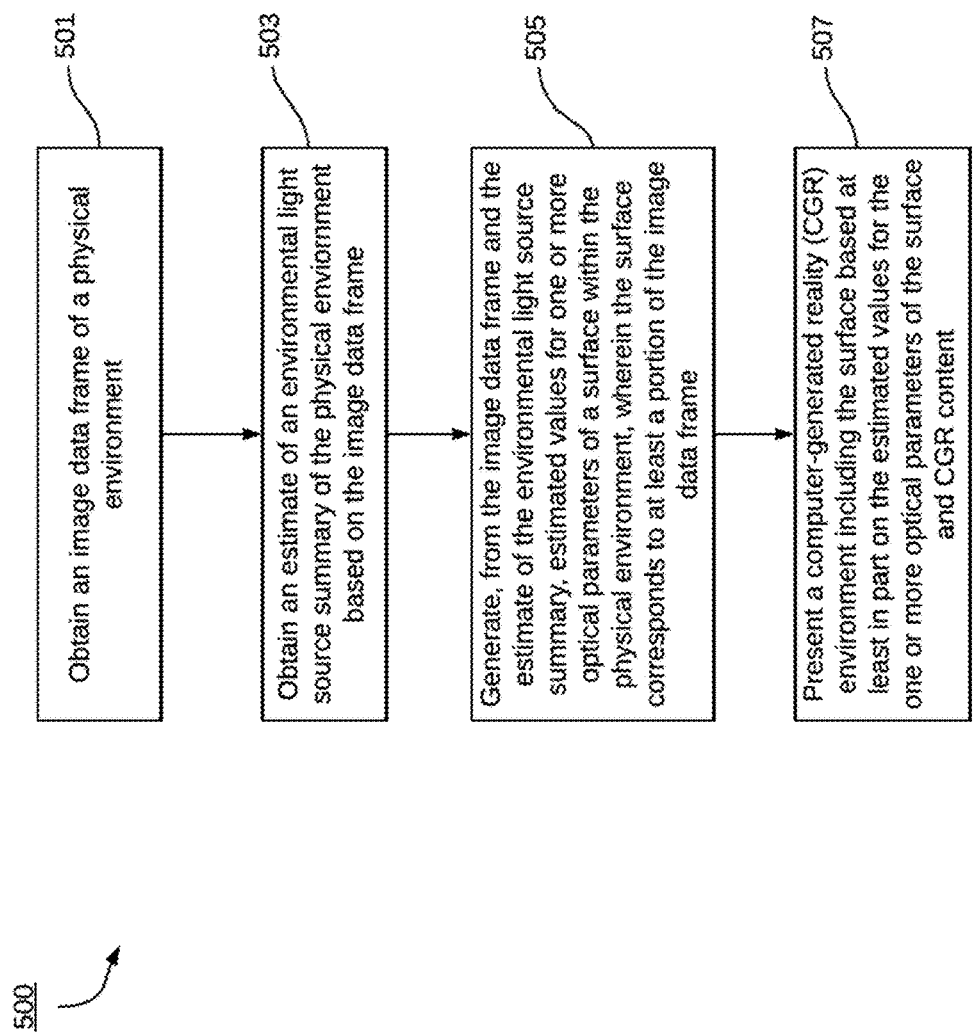
FIG. 5 is a flowchart representation of a method of estimating optical parameters of one or more surfaces within image data in accordance with some implementations.

FIG. 5 is a flowchart representation of a method 500 of estimating optical parameters of surfaces within image data in accordance with some implementations. In some implementations, the method 500 is performed at an image processing system (e.g., the run-time implementation 200b of the image processing system 100 shown in FIG. 2C) including a trained neural network (e.g., the trained neural network 251 shown in FIG. 2C). In some implementations, the method 500 is performed by an electronic device (e.g., the electronic device 420 shown in FIGS. 4A, 4B, and 8; the controller 403 shown in FIGS. 4A, 4B, and 7; or a suitable combination thereof) with one or more processors and non-transitory memory. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 501, the method 500 includes obtaining an image data frame of a physical environment. For example, an electronic device (e.g., the electronic device 420 shown in FIGS. 4A, 4B, and 8) obtains the input image data frame via image sensors (e.g., the image sensor 101 shown in FIGS. 1 and 2C). In some implementations, the electronic device includes the image sensor (e.g., a camera), and the method 500 includes capturing the input image using the image sensor. In some implementations, the electronic device corresponds to a near-eye system, mobile phone, tablet, wearable computing device, or the like.

As represented by block 503, the method 500 includes obtaining an estimate of an environmental light source summary of the physical environment based on the image data frame. In some implementations the environmental light source summary may include parameters such as a surface shading parameter (e.g., the surface shading parameter 206 shown in FIG. 2B) and/or environmental light source parameters (the environmental light source parameters 208 shown in FIG. 2B). The environmental light source summary is provided in order for the optical parameter estimation engine (e.g., the optical parameter estimation engine 115 shown in FIGS. 1 and 2C) to include the light source conditions and shadows that are already present within the image data frame.

As represented by block 505, the method 500 includes generating, from the image data frame and the estimate of the environmental light source summary, estimated values for one or more optical parameters of a surface within the physical environment, wherein the surface corresponds to at least a portion of the image data frame. The environmental light source summary ensures that any light source conditions and shadows from the image data frame are taken into account when generating values for the one or more optical parameters of a surface within the image data frame. In some implementations, the one or more optical parameters correspond to at least one of an albedo optical parameter, a reflectance optical parameter, and a third optical parameter. In some implementations the estimated values for the one or more optical parameters are an output of a machine learning function or engine. One of ordinary skill in the art will appreciate that many optical parameters may be accounted for such as albedo, reflectance, roughness, and/or the like.

As represented by block 507, the method 500 includes presenting a CGR environment (e.g., the CGR environment 125 shown in FIGS. 1 and 2C) including the surface based at least in part on the estimated values (e.g., the estimated value 117 shown in FIG. 2C) for the one or more optical parameters of the surface and CGR content. In some embodiments, the CGR content is obtained from a CGR content database (e.g., the CGR content database 104 shown in FIGS. 1 and 2C) that will be modified according to the estimated values for the one or more optical parameters.

As a non-limiting example, the CGR environment may be depicted as the CGR environment 463a shown in FIG. 4A or the CGR environment 463b shown in FIG. 4B. In some implementations, the CGR environment includes (1) a CGR light source (e.g., the CGR lamp 426 shown in FIG. 4A) changing an appearance of a representation of a real-world surface (e.g., the example operating environment 400a shown in FIG. 4A), or (2) a real-world light source reflected off a real-world surface (e.g., the portion of the wall 418 shown in FIG. 4B) changing an appearance of a surface of a CGR object (e.g., the example operating environment 400b shown in FIG. 4B).

In some implementations, presenting the CGR environment (e.g., the CGR environment 463a shown in FIG. 4A) further includes rendering a CGR light source (e.g., the CGR lamp 426 shown in FIG. 4A) and a representation (e.g., the representation of the table 424 shown in FIG. 4A) of the surface, wherein the representation of the real-world surface is determined based at least in part on light propagation from the CGR light source onto the real-world surface based at least in part on the estimated values for the one or more optical parameters of the real-world surface and the environmental light source summary of the physical environment. For example, the CGR environment can include a CGR light source (e.g., the CGR lamp 426 shown in FIG. 4A) that changes the appearance of a real-world surface (e.g., the representation 424 of the table 414 shown in FIG. 4A).

In some implementations, presenting the CGR environment (e.g., the CGR environment 463b shown in FIG. 4B) further includes rendering a CGR object (e.g., the CGR dining table 428 shown in FIG. 4B) based on light propagation of the real-world surface in the physical environment that reflects light from a real-world light source onto (e.g., the portion of the wall 418 shown in FIG. 4B) the CGR object (e.g., the CGR dining table 428 in FIG. 4B), wherein the light propagation of the real-world surface is determined based at least in part on the estimated values for the one or more optical parameters of the real-world surface and the environmental light source summary of the physical environment. For example, the CGR environment can include a CGR object (e.g., the CGR dining table 428 shown in FIG. 4B) with a surface that is affected by a light source reflected off real-world surfaces (e.g., the portion of the wall 418 shown in FIG. 4B).

In some implementations, the method 500 further includes updating the one or more optical parameters based on movement of objects within an environment. For example, as shown in FIG. 4B, a chandelier 416 may swing which causes the light source from the chandelier 416 to also swing and affect light source conditions in the environment. As such, the surface on the CGR dining table 428 will change appearances due to the swinging movement of the light source from the chandelier 416.

In some implementations, the method 500 further includes updating the one or more optical parameters based on a pose change of the electronic device, wherein the pose change corresponds to a change from a first perspective view to a second perspective view of the respective object. For example, as shown in FIG. 4A, the first perspective view the table 414 changes from a first perspective view to a second perspective view if a user wearing the electronic device walks up to the table 414 and stares down at the table 414. As another example, as shown in FIG. 4A, if the user is stationary but rotates his head upward or to the left or right, the table 414 may no longer be within the field-of-view 413 of an external-facing image sensor of the electronic device.

In some implementations, the method 500 further includes identifying a material associated with the surface within the physical environment based at least in part on the estimated values for the one or more optical parameters. In some implementations, the method 500 further includes identifying the material based on identifying the material from a material signature library (e.g. the material database 103 shown in FIGS. 1 and 2A) that includes known values (e.g., the known value 116 shown in FIG. 1) for the one or more optical parameters for a plurality of material types. To that end, the method includes identifying the material by matching the estimated values for the one or more optical parameters of the surface against known values for the one or more optical parameters of the material.

For example, the electronic device may identify a material type of a table (e.g., the table 414 shown in FIG. 4A) to be a particular wood grain. In turn, the electronic device may obtain a representation of the wood grain from the CGR content database (e.g., the CGR content database 104 shown in FIGS. 1 and 2C) and query a material database (e.g., the material database 103 shown in FIGS. 1 and 2A) to obtain material parameters that are associated with wood grain surfaces. In some implementations, the estimated values (e.g., the estimated values shown in FIG. 2C) for the one or more optical parameters of the material matches the known value for the one or more optical parameters of the material within a confidence threshold. For example, if the electronic device identifies a particular material with a low confidence value then the electronic device may not reliably rely on using the optical parameters associated with the particular material from CGR content in subsequent operations. On the other hand, if the electronic device identifies the particular material with a high confidence value then the electronic device may rely on using the representation of the wood grain from the CGR content 104 and optical parameters associated with the particular material in subsequent operations.

In some implementations, the method 500 further includes identifying one or more planes within the image data frame, wherein a respective plane among the one or more planes corresponds to the surface. In some implementations, generating the estimated values for the one or more optical parameters of the surface includes generating the estimated values for one or more optical parameters for pixels associated with the respective plane within the physical environment. For example, a plane within the image frame may correspond to a table top such as the table 414 shown in FIG. 4A. In some implementations, the image processing system crops pixels around the planes that are identified within the image data frame. Cropping the pixels around the identified planes allows the image processing system to reduce the computational power required by the electronic device because the electronic device may omit performing analysis on the other surfaces (e.g., that have already been cropped out) in the scene. In another example, cropping the pixels around the identified planes may also allow the image processing system to limit the analysis to surfaces associated with a CGR object (e.g., the CGR dining table 428 shown in FIG. 4B) because the system does not need to analyze the optical parameters of materials if there are no other CGR objects nearby.

In some implementations, the method 500 further includes identifying one or more objects within the image data frame using object recognition, instance segmentation, semantic segmentation, or the like, wherein a portion of a respective object among the one or more objects corresponds to the surface. In some implementations, generating estimated values for the one or more optical parameters of the surface includes generating estimated values for one or more optical parameters for pixels associated with the respective object within the physical environment. Similar to the example above, cropping pixels around an identified object also allows the image processing system to reduce the computational power required by the electronic device because the identified object allows the image processing system to limit the analysis to the identified object.

In some implementations, the method 500 further includes performing the series of steps of 503, 505, and 507 on multiple independent surfaces that are recognized within the image data frame in parallel. To that end, the method 500 further includes generating, from the image data frame and the estimate of the light source summary, values for a second set of one or more optical parameters of a second surface within at least a portion of the image data frame. To that end, presenting the CGR environment includes presenting the first surface based at least in part on the generated values for the first set of one or more optical parameters and the second surface based at least in part on the generated values for the second set of one or more optical parameters along with the CGR content.

FIG. 6 is a block diagram of an example of the neural network 131 in FIGS. 1 and 2B in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the neural network 131 includes an input layer 620, a first hidden layer 622, a second hidden layer 624, an output layer A 626, an output layer B 628, and an output layer C 630. While the neural network 131 (e.g., the neural network 131 shown in FIGS. 1 and 2B) includes two hidden layers as an example, those of ordinary skill in the art will appreciate from the present disclosure that one or more additional hidden layers may be present in various implementations. Adding additional hidden layers adds to the computational complexity and memory demands, but may improve performance for some applications. Furthermore, while the neural network 131 includes three output layers as an example, those of ordinary skill in the art will appreciate from the present disclosure that additional or fewer output layers may be present in various implementations.

In various implementations, the input layer 620 is coupled (e.g., configured) to receive inputs of environmental light source parameters 208 (e.g., the environmental light source parameters 208 shown in FIG. 2B) and a computer-generated photorealistic image 136 (e.g., the computer-generated photorealistic image 136 shown in FIG. 2B). In various implementations, as a non-limiting example, the input layer 620 includes a number of long short-term memory (LSTM) logic units 620*a*, which are also referred to as model(s) of neurons by those of ordinary skill in the art. In some such implementations, an input matrix from the features to the LSTM logic units 620*a* include rectangular matrices. For example, the size of this matrix is a function of the number of features included in the feature stream.

In some implementations, as a non-limiting example, the first hidden layer 622 includes a number of LSTM logic units 622*a*. Those of ordinary skill in the art will appreciate that, in such implementations, the number of LSTM logic units per layer is orders of magnitude smaller than previously known approaches, which allows such implementations to be embedded in highly resource-constrained devices. As illustrated in the example of FIG. 6, the first hidden layer 622 receives its inputs from the input layer 620. For example, the first hidden layer 622 performs one or more of following: a convolutional operation, a nonlinearity operation, a normalization operation, a pooling operation, and/or the like.

In some implementations, as a non-limiting example, the second hidden layer 624 includes a number of LSTM logic units 624*a*. In some implementations, the number of LSTM logic units 624*a* is the same as or similar to the number of LSTM logic units 620*a* in the input layer 620 or the number of LSTM logic units 622*a* in the first hidden layer 622. As illustrated in the example of FIG. 6, the second hidden layer 624 receives its inputs from the first hidden layer 622. Additionally and/or alternatively, in some implementations, the second hidden layer 624 receives its inputs from the input layer 620. For example, the second hidden layer 624 performs one or more of following: a convolutional operation, a nonlinearity operation, a normalization operation, a pooling operation, and/or the like.

In some implementations, as a non-limiting example, the output layer A 626 includes a number of LSTM logic units 626*a*. In some implementations, the number of LSTM logic units 626*a* is the same as or similar to the number of LSTM logic units 620*a* in the input layer 620, the number of LSTM logic units 622*a* in the first hidden layer 622, or the number of LSTM logic units 624*a* in the second hidden layer 624. In some implementations, the output layer A 626 is a task-dependent layer that performs a computer-vision related task on the output of the second hidden layer 624. As a non-limiting example the computer-vision related tasks might include tasks such as a feature extraction, object recognition, object detection, pose estimation, or the like. In some implementations, the output layer A 626 includes an implementation of multinomial logistic function (e.g., a soft-max function). In some implementations, the output layer A 626 produces a first estimated value 632 for an albedo optical parameter.

In some implementations, as a non-limiting example, the output layer B 628 includes a number of LSTM logic units 628a. In some implementations, the number of LSTM logic units 628a is the same as or similar to the number of LSTM logic units 620a in the input layer 620, the number of LSTM logic units 622a in the first hidden layer 622, or the number of LSTM logic units 624a in the second hidden layer 624. In some implementations, the output layer B 628 is a task-dependent layer that performs a computer-vision related task on the output of the second hidden layer 624. As a non-limiting example the computer-vision related tasks might include tasks such as a feature extraction, object recognition, object detection, pose estimation, or the like. In some implementations, the output layer B 628 includes an implementation of multinomial logistic function (e.g., a soft-max function). In some implementations, the output layer B 628 produces a second estimated value 634 for a reflectance optical parameter.

In some implementations, as a non-limiting example, the output layer C 630 includes a number of LSTM logic units 630a. In some implementations, the number of LSTM logic units 630a is the same as or similar to the number of LSTM logic units 620a in the input layer 620, the number of LSTM logic units 622a in the first hidden layer 622, or the number of LSTM logic units 624a in the second hidden layer 624. In some implementations, the output layer C 630 is a task-dependent layer that performs a computer-vision related task on the output of the second hidden layer 624. As a non-limiting example the computer-vision related tasks might include tasks such as a feature extraction, object recognition, object detection, pose estimation, or the like. In some implementations, the output layer C 630 includes an implementation of multinomial logistic function (e.g., a soft-max function). In some implementations, the output layer C 630 produces a third estimated value 636 for a third optical parameter.

In some implementations, the estimated values 117 shown in FIGS. 1 and 2B includes at least the first estimated value 632, the second estimated value 634, and the third estimated value 636.

Neural networks, such as CNNs, are often used to solve computer vision problems including feature extraction, object recognition, object detection, and pose estimation. A modern CNN is typically described as having an input layer, a number of hidden layers, and an output layer. In at least some scenarios, the input to the input layer of the CNN is an image data frame while the output layer is a task-dependent layer. The hidden layers often include one of a plurality of operations such as convolutional, nonlinearity, normalization, and pooling operations. For example, a respective convolutional layer may include a set of filters whose weights are learned directly from data. Continuing with this example, the output of these filters are one or more feature maps that are obtained by applying filters to the input data of the convolutional layer.

Figure 7:
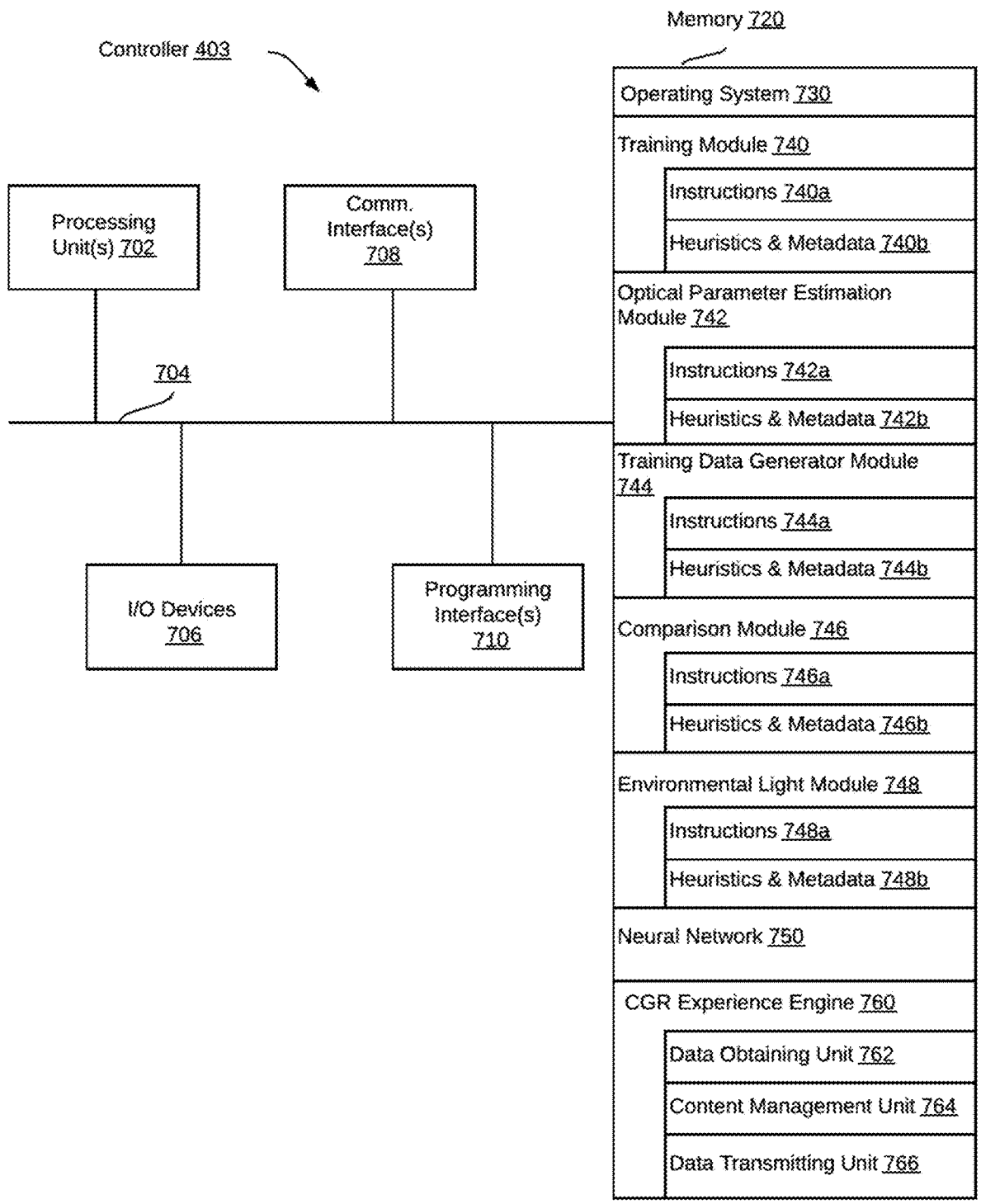
FIG. 7 is a block diagram of an example controller in accordance with some implementations.

FIG. 7 is a block diagram of an example controller (e.g., the controller 403 shown in FIGS. 4A and 4B) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the controller 403 includes one or more processing units 702 (e.g., microprocessors, application-specific integrated-circuits (ASICs), field-programmable gate arrays (FPGAs), graphics processing unit (GPUs), central processing units (CPUs), processing cores, and/or the like), one or more input/output (I/O) devices and sensors 706, one or more communications interface 708 (e.g., universal serial bus (USB), IEEE 802.3x, IEEE 802.11x, IEEE 802.16x, global system for mobile communications (GSM), code division multiple access (CDMA), time division multiple access (TDMA), global positioning systems (GPS), infrared (IR), BLUETOOTH, ZIGBEE, and/or the like type interfaces), one or more programming (e.g., I/O) interfaces 710, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of a keyboard, a mouse, a touchpad, a joystick, one or more microphones, one or more speakers, one or more image sensors, one or more displays, and/or the like.

The memory 720 includes high-speed random-access memory, such as DRAM, SRAM, DDR, RAM, or other random-access solid-state memory devices, and may include non-volatile memory, such as one or more magnetic disk storage devices, optical disk storage devices, flash memory devices, or other non-volatile solid-state storage devices. The memory 720 optionally includes one or more storage devices remotely located from the one or more one or more processing units 702. The memory 720 comprises a non-transitory computer readable storage medium. In some implementations, the memory 720 or the non-transitory computer readable storage medium of the memory 720 stores the following programs, modules, and data structures, or a subset thereof including an optional operating system 730, a training module 740, an optical parameter estimation module 742, a training data generator module 744, a comparison module 746, an environmental light module 748, a neural network 750, and a CGR experience engine 760. In some implementations, one or more instructions are included in a combination of logic and non-transitory memory.

The operating system 730 includes procedures for handling various basic system services and for performing hardware-dependent tasks.

In some implementations, the training module 740 (e.g. the training engine 111 shown in FIGS. 1 and 2B) is configured to train the various portions of the neural network 750 (e.g., the neural network 131 shown in FIGS. 1 and 2B). To that end, in various implementations, training module 740 includes instructions 740a and/or logic therefor, and heuristics and metadata 740b therefor.

In some implementations, the optical parameter estimation module 742 (e.g., the optical parameter estimation engine 115 shown in FIGS. 1, 2B, and 2C) is configured to generate estimated values (e.g., the estimated values 117 shown in FIGS. 1, 2B and 2C), for one or more optical parameters of a surface within image data frames. To that end, in various implementations, the optical parameter estimation module 742 includes instructions 742*a* and/or logic therefor, and heuristics and metadata 742*b* therefor.

In some implementations, the training data generator module 744 (e.g., the training data generator 107 shown in FIGS. 1 and 2A) is configured to generate training data (e.g., the training dataset 109 in FIGS. 1, 2A, and 2B). To that end in various implementations, the training data generator module 744 includes instructions 744*a* and/or logic therefor, and heuristics and metadata 744*b* therefor.

In some implementations, the comparison module 746 (e.g., the comparison engine 133 shown in FIG. 2B) is configured to compare target values (e.g., the target values 204 shown in FIG. 2B) with the estimated values (e.g., the estimated values 117 shown in FIG. 2B). In some implementations, the comparison module 746 (e.g., the comparison engine 133 shown in FIG. 2B) is also configured to compare reference reconstruction images (e.g., the albedo reference reconstruction image 231, the reflectance reference reconstruction image 233, the third reference reconstruction image 235 shown in FIG. 2B) with reconstruction images (e.g., the albedo reconstruction image 242, reflectance reconstruction image 243, and third reconstruction image 245 shown in FIG. 2B). In some implementations, the comparison module 746 is further configured to determine a loss value based on aggregating: (A) the differences between the estimated values and the target values for the one or more optical parameters of the surface, and (B) differences between the pixels of the reference reconstruction images and the reconstruction images. To that end in various implementations, the comparison module 746 includes instructions 746*a* and/or logic therefor, and heuristics and metadata 746*b* therefor.

In some implementations, the environmental light module 748 (e.g., the environmental light source summary engine 129 shown in FIGS. 1 and 2C) is configured to generate an estimate of an environmental light source summary for image data frames. To that end in various implementations, the environmental light module 748 includes instructions 748*a* and/or logic therefor, and heuristics and metadata 748*b* therefor.

In some implementations, the neural network 750 (e.g., the neural network 131 shown in FIGS. 1 and 2B, the trained neural network 251 shown in FIG. 2C, and the neural network 131 shown in FIG. 6) is configured to generate estimated values (e.g., the estimated values 117 shown in FIGS. 1, 2B, and 2C) for one or more optical parameters of a surface within image data frames. In some implementations, the training module 740 trains the neural network 750 (e.g., the neural network 131 shown in FIGS. 1 and 2B).

In some implementations, the CGR experience engine 760 is configured to manage and coordinate one or more CGR experiences for one or more users. To that end, in various implementations, the CGR experience engine 760 includes a data obtaining unit 762, a content manager unit 764, and a data transmitting unit 766.

In some implementations, the data obtaining unit 762 is configured to obtain data (e.g., presentation data, user interaction data, sensor data, location data, etc.) from at least the electronic device 420 shown in FIGS. 4A, 4B, and 8. To that end, in various implementations, the data obtaining unit 762 includes instructions and/or logic therefor, and heuristics and metadata therefor.

In some implementations, the content management unit 764 is configured to manage and coordinate the CGR experience presented to the user by the electronic device 420 shown in FIGS. 4A, 4B, and 8. To that end, in various implementations, the content management unit 764 includes instructions and/or logic therefor, and heuristics and metadata therefor.

In some implementations, the data transmitting unit 766 is configured to transmit data (e.g., presentation data, location data, etc.) to at least the electronic device 420 shown in FIGS. 4A, 4B, and 8. To that end, in various implementations, the data transmitting unit 766 includes instruction and/or logic therefor, and heuristics and metadata therefor.

Although the training module 740, the optical parameter estimation module 742, the training data generator module 744, the comparison module 746, the environmental light module 748, the neural network 750, and the CGR experience engine 760 are shown as residing on a single device (e.g., the controller 403), it should be understood that in some implementations, any combinations of the training module 740, the optical parameter estimation module 742, the training data generator module 744, the comparison module 746, the environmental light module 748, the neural network 750, and the CGR experience engine 760 may be located in separate computing devices.

Moreover, FIG. 7 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation. In some implementations, the functions and/or components of the controller 403 are combined with or provided by the electronic device 420 shown below in FIG. 8.

FIG. 8 is a block diagram of an example of an example electronic device 420 (e.g., a mobile phone, tablet, laptop, near-eye system, etc.) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the electronic device 420 includes one or more processing units 802 (e.g., microprocessors, ASICs, FPGAs, GPUs, CPUs, processing cores, and/or the like), one or more I/O devices and sensors 806, one or more communications interfaces 808 (e.g., USB, IEEE 802.3x, IEEE 802.11x, IEEE 802.16x, GSM, CDMA, TDMA, GPS, IR, BLUETOOTH, ZIGBEE, and/or the like type interfaces), one or more programming interfaces 810, one or more displays 812, one or more image sensors 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, and/or the like.

In some implementations, the one or more displays 812 are capable of presenting a CGR environment (e.g., the CGR environment 125 shown in FIGS. 1 and 2C) or CGR content. In some implementations, the one or more displays 812 are also configured to present flat video content to the user (e.g., a 2-dimensional or "flat" audio video interleave (AVI), flash video (FLV), Windows Media Video (WMV), or the like file associated with a TV episode or a movie, or live video pass-through of the operating environments 400a and 400b. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro mechanical systems (MEMS), and/or the like display types. In some implementations, the one or more displays 812 correspond to diffractive, reflective, polarized, holographic, etc. waveguide displays. For example, the electronic device 420 includes a single display. In another example, the electronic device 420 includes a display for each eye of the user.

In some implementations, the one or more image sensors 814 (e.g., the image sensor 101 shown in FIGS. 1 and 2C) are configured to obtain image data frames. For example, the one or more image sensors 814 correspond to one or more RGB cameras (e.g., with a complementary metal-oxide-semiconductor (CMOS) image sensor, or a charge-coupled device (CCD) image sensor), infrared (IR) image sensors, event-based cameras, and/or the like.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 comprises a non-transitory computer readable storage medium. In some implementations, the memory 820 or the non-transitory computer readable storage medium of the memory 820 stores the following programs, modules and data structures, or a subset thereof including an optional operating system 830, and a CGR presentation module 840.

The operating system 830 includes procedures for handling various basic system services and for performing hardware dependent tasks. In some implementations, the CGR presentation module 840 is configured to present CGR content to the user via the one or more displays 812. To that end, in various implementations, the CGR presentation module 840 includes a data obtaining unit 842, a CGR presenting unit 844, and a data transmitting unit 846.

In some implementations, the data obtaining unit 842 is configured to obtain data (e.g., presentation data, interaction data, location data, etc.) from at least one of the one or more I/O sensors 806 associated with the electronic device 420 or the controller shown in FIGS. 4A, 4B, and 7. To that end, in various implementations, the data obtaining unit 842 includes instructions and/or logic therefor, and heuristics and metadata therefor.

In some implementations, the CGR presenting unit 844 is configured to present a CGR environment (e.g., the CGR environment 125 shown in FIGS. 1 and 2C) via the one or more displays 812 (e.g., the display screen 422 shown in FIGS. 4A and 4B). To that end, in various implementations, the CGR presenting unit 844 includes instructions and/or logic therefor, and heuristics and metadata therefor.

In some implementations, the data transmitting unit 846 is configured to transmit data (e.g., presentation data, location data, etc.) to the controller 403 shown in FIGS. 4A, 4B, and 7. To that end, in various implementations, the data transmitting unit 846 includes instructions and/or logic therefor, and heuristics and metadata therefor.

Although the data obtaining unit 842, the CGR presenting unit 844, and the data transmitting unit 846 are shown as residing on a single device (e.g., the electronic device 420), it should be understood that in some implementations, any combination of the data obtaining unit 842, the CGR presenting unit 844, and the tracking unit 846 may be located in separate computing devices. In some implementations, the functions and/or components of the controller 403 are combined with or provided by the electronic device 420.

Moreover, FIG. 8 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first image could be termed a second image, and, similarly, a second image could be termed a first image, which changing the meaning of the description, so long as the occurrences of the "first image" are renamed consistently and the occurrences of the "second image" are renamed consistently. The first image and the second image are both images, but they are not the same image.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at an electronic device including one or more processors and a non-transitory memory:
        obtaining an image data frame of a physical environment;
        obtaining an estimate of an environmental light source summary of the physical environment based on the image data frame;
        generating a cropped image data frame based on the image data frame of the physical environment by masking pixels outside of a physical surface within the physical environment, wherein the physical surface corresponds to at least a portion of the image data frame;
        generating, from the cropped image data frame and the estimate of the environmental light source summary, estimated values for one or more optical parameters of the physical surface within the physical environment;
        obtaining a location within the physical environment for a computer-generated reality (CGR) object;
        determining light propagation information relative to the location within the physical environment for the CGR object, wherein the light propagation information at least corresponds to light propagated onto the location from the physical surface in the physical environment that corresponds to light from a real-world light source that is reflected by the physical surface in the physical environment onto the location, wherein the light propagation information is determined based at least in part on the estimated values for the one or more optical parameters of the surface and the estimate of the environmental light source summary of the physical environment;
        rendering the CGR object based at least in part on the estimate of the environmental light source summary of the physical environment and the light propagation information;
        generating a synthesized image data frame associated with a CGR environment by compositing the image data frame of the physical environment and the rendered CGR object at the location within the physical environment; and
        presenting the synthesized image data frame associated with the CGR environment.

2. The method of claim 1, further comprising:
    rendering a CGR light source and a representation of the physical surface, wherein the representation of the physical surface is determined based at least in part on light propagation from the CGR light source onto the physical surface based at least in part on the estimated values for the one or more optical parameters and the estimate of the environmental light source summary of the physical environment, and
    wherein generating the synthesized image data frame includes generating the synthesized image data frame based on the image data frame of the physical environment, the rendered CGR object, the rendered CGR light source, and the representation of the physical surface.

3. The method of claim 1, further comprising:
    identifying a material associated with the physical surface within the physical environment based at least in part on the estimated values for the one or more optical parameters.

4. The method of claim 3, wherein identifying the material further includes identifying the material from a material signature library by matching the estimated values for the one or more optical parameters of the physical surface against known values for the one or more optical parameters of the material, wherein the material signature library includes the known values for the one or more optical parameters for a plurality of materials type.

5. The method of claim 4, wherein the estimated values for the one or more optical parameters of the physical surface matches the known values for the one or more optical parameters of the material within a confidence threshold.

6. The method of claim 1, further comprising:
    identifying one or more planes within the image data frame, wherein a respective plane among the one or more planes corresponds to the physical surface.

7. The method of claim 6, wherein generating the cropped image data frame includes masking pixels not associated with the one or more planes within the image data frame.

8. The method of claim 1, further comprising:
    identifying one or more objects within the image data frame, wherein a portion of a respective object among the one or more objects corresponds to the physical surface.

9. The method of claim 8, wherein generating the cropped image data frame includes masking pixels not associated with the one or more objects within the image data frame.

10. The method of claim 1, wherein the one or more optical parameters correspond to at least one of an albedo optical parameter and a reflectance optical parameter.

11. The method of claim 1, further comprising:
    updating the one or more optical parameters of the physical surface based on movement of objects within the CGR environment.

12. The method of claim 1, further comprising:
    updating the one or more optical parameters of the physical surface based on a pose change of the electronic device, wherein the pose change corresponds to a change from a first perspective view to a second perspective view of the respective object.

13. The method of claim 1, further comprising:
generating, from the image data frame and the estimate of the light source summary, values for a second set of one or more optical parameters of a second physical surface within at least a portion of the image data frame, and
wherein the CGR environment includes the first physical surface based at least in part on the generated values for the first set of one or more optical parameters and the second physical surface based at least in part on the generated values for the second set of one or more optical parameters along with the CGR object.

14. The method of claim 1, wherein the physical surface includes a primary surface and a sub-surface, and wherein the estimated values for one or more optical parameters of a physical surface within the physical environment are generated based on a simplified macro surface for the physical surface that corresponds to an aggregate directional scattering of the primary surface and the sub-surface.

15. An electronic device including one or more processors, a non-transitory memory, and one or more programs stored in the non-transitory memory, which, when executed by the one or more processors, cause the electronic device to:
obtain an image data frame of a physical environment;
obtain an estimate of an environmental light source summary of the physical environment based on the image data frame;
generate a cropped image data frame based on the image data frame of the physical environment by masking pixels outside of a physical surface within the physical environment, wherein the physical surface corresponds to at least a portion of the image data frame;
generate, from the cropped image data frame and the estimate of the environmental light source summary, estimated values for one or more optical parameters of the physical surface within the physical environment;
obtain a location within the physical environment for a computer-generated reality (CGR) object;
determine light propagation information relative to the location within the physical environment for the CGR object, wherein the light propagation information at least corresponds to light propagated onto the location from the physical surface in the physical environment that corresponds to light from a real-world light source that is reflected by the physical surface in the physical environment onto the location, wherein the light propagation information is determined based at least in part on the estimated values for the one or more optical parameters of the surface and the estimate of the environmental light source summary of the physical environment;
render the CGR object based at least in part on the estimate of the environmental light source summary of the physical environment and the light propagation information;
generate a synthesized image data frame associated with a CGR environment by compositing the image data frame of the physical environment and the rendered CGR object; and
present the synthesized image data frame associated with the CGR environment at the location within the physical environment.

16. The electronic device of claim 15, wherein one or more programs further cause the electronic device to:
render a CGR light source and a representation of the physical surface, wherein the representation of the physical surface is determined based at least in part on light propagation from the CGR light source onto the physical surface based at least in part on the estimated values for the one or more optical parameters and the estimate of the environmental light source summary of the physical environment, and
wherein generating the synthesized image data frame includes generating the synthesized image data frame based on the image data frame of the physical environment, the rendered CGR object, the rendered CGR light source, and the representation of the physical surface.

17. The electronic device of claim 15, wherein one or more programs further cause the electronic device to:
update the one or more optical parameters of the physical surface based on movement of objects within the CGR environment.

18. The electronic device of claim 15, wherein one or more programs further cause the electronic device to:
update the one or more optical parameters of the physical surface based on a pose change of the electronic device, wherein the pose change corresponds to a change from a first perspective view to a second perspective view of the respective object.

19. A non-transitory memory storing one or more programs, which, when executed by one or more processors of an electronic device, cause the electronic device to:
obtain an image data frame of a physical environment;
obtain an estimate of an environmental light source summary of the physical environment based on the image data frame;
generate a cropped image data frame based on the image data frame of the physical environment by masking pixels outside of a physical surface within the physical environment, wherein the physical surface corresponds to at least a portion of the image data frame;
generate, from the cropped image data frame and the estimate of the environmental light source summary, estimated values for one or more optical parameters of the physical surface within the physical environment;
obtain a location within the physical environment for a computer-generated reality (CGR) object;
determine light propagation information relative to the location within the physical environment for the CGR object, wherein the light propagation information at least corresponds to light propagated onto the location from the physical surface in the physical environment that corresponds to light from a real-world light source that is reflected by the physical surface in the physical environment onto the location, wherein the light propagation information is determined based at least in part on the estimated values for the one or more optical parameters of the surface and the estimate of the environmental light source summary of the physical environment;
render the CGR object based at least in part on the estimate of the environmental light source summary of the physical environment and the light propagation information;
generate a synthesized image data frame associated with a CGR environment by compositing the image data frame of the physical environment and the rendered CGR object at the location within the physical environment; and present the synthesized image data frame associated with the CGR environment.

20. The non-transitory memory of claim 19, wherein one or more programs further cause the electronic device to:
render a CGR light source and a representation of the physical surface, wherein the representation of the physical surface is determined based at least in part on light propagation from the CGR light source onto the physical surface based at least in part on the estimated values for the one or more optical parameters and the estimate of the environmental light source summary of the physical environment, and
wherein generating the synthesized image data frame includes generating the synthesized image data frame based on the image data frame of the physical environment, the rendered CGR object, the rendered CGR light source, and the representation of the physical surface.

21. The non-transitory memory of claim 19, wherein one or more programs further cause the electronic device to:
update the one or more optical parameters of the physical surface based on movement of objects within the CGR environment.

22. The non-transitory memory of claim 19, wherein one or more programs further cause the electronic device to:
update the one or more optical parameters of the physical surface based on a pose change of the electronic device, wherein the pose change corresponds to a change from a first perspective view to a second perspective view of the respective object.

* * * * *